(12) United States Patent
Williams et al.

(10) Patent No.: US 7,701,972 B1
(45) Date of Patent: Apr. 20, 2010

(54) INTERNET PROTOCOL ANALYZING

(75) Inventors: Jamie R. Williams, Alpharetta, GA (US); Thomas Z. Dong, Marietta, GA (US)

(73) Assignee: Verint Americas Inc., Melville, NY (US)

( * ) Notice: Subject to any disclaimer, the term of this patent is extended or adjusted under 35 U.S.C. 154(b) by 1055 days.

(21) Appl. No.: 11/394,411

(22) Filed: Mar. 31, 2006

(51) Int. Cl.
*H04J 3/16* (2006.01)
(52) U.S. Cl. .................................. 370/469; 370/395.5
(58) Field of Classification Search ................ 370/252, 370/389, 400, 352–358, 395.5, 395.52, 401, 370/402, 469; 382/305, 506, 143; 709/105
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |

(Continued)

FOREIGN PATENT DOCUMENTS

EP 0453128 A2 10/1991

(Continued)

OTHER PUBLICATIONS

"Customer Spotlight: Navistar International," Web pae, unverified print date of Apr. 1, 2002.

(Continued)

*Primary Examiner*—Brenda Pham
(74) *Attorney, Agent, or Firm*—Lawrence A. Aaronson, P.C.

(57) ABSTRACT

Included are methods for facilitating routing of control data associated with a communication to a plurality of recorders. One such method, among others, includes receiving control data related to a communication and routing the received control data to at least one recorder via a layer 3 protocol.

20 Claims, 19 Drawing Sheets

U.S. PATENT DOCUMENTS

| | | |
|---|---|---|
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,379,628 B2 * | 5/2008 | Nagaya et al. ............ 382/305 |
| 7,483,379 B2 * | 1/2009 | Kan et al. ................ 370/237 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0138560 A1 | 6/2005 | Lee et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |

WO        WO 00/16207        3/2000

OTHER PUBLICATIONS

"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"PriceWaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of AI in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the $8^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs*," *Communications ACM* 38(7):27-39 (Jul. 1995).
O'Herron, "CenterForce Technologies' CenterForce Analyzer," Web page unverified print date of Mar. 2, 2002, unverified cover date of Jun. 1, 1999.
O'Roark, "Basic Skills Get a Boost," Technical Training pp. 10-13 (Jul./Aug. 1998).
Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7676 (1998).
Untitled, 10$^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. Déjà vu—*Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, Dec. 14, 1999.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson.*U.S. West Revisits Interactive TV*, Interactive Week, Nov. 28, 1999.

* cited by examiner

INTERNET PROTOCOL ANALYZING

BACKGROUND

In an Internet Protocol (IP) communications network, any of a plurality of communications devices may be configured to communicate data to and from other communications devices. Users of the communications devices, network administrators, and/or third parties may desire to record these communications. Currently, networks are configured to provide a recorder to passively record such communications. While such a solution may accommodate some recording needs, many networks lack the ability to facilitate recording of communications between endpoints across a wide area network.

SUMMARY

Included are methods for facilitating routing of control data associated with a communication to a plurality of recorders. One such method, among others, includes receiving control data related to a communication and routing the received control data to at least one recorder via a layer 3 protocol.

Also included are embodiments of a Internet protocol (IP) analyzer configured to facilitate recording of at least one communication. One embodiment of an IP analyzer includes logic configured to receive control data related to a communication and logic configured to route, via a layer 2 protocol, the received control data to a recorder.

Additionally included are embodiments of a system for routing communication data to a plurality of recorders. One embodiment of a system includes an Internet Protocol (IP) analyzer coupled to a plurality of recorders, the IP analyzer configured to select at least one load balancer that is configured to receive communication data related to the communication and route control data to the selected at least one load balancer.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Included in this description are systems and methods that may be configured for recording communications utilizing call control forwarding, intelligent call control distribution, and/or other functions. In at least one nonlimiting example, a network can be configured where the point of interception of control data is remote from a desired recorder. In such a configuration, the recorder may not be supplied with mirrored control data. A component, such as an Internet Protocol (IP) analyzer may be configured to forward received control data, such as across a TCP/IP connection. Other embodiments can provide an IP analyzer that is configured to determine which recorder (or recorder group) is configured to record for a predetermined gateway or endpoint. The IP analyzer can also be configured to only forward control data to recorders that are configured to receive communication data related to a particular communication.

Load Balancer

Figure 1A:
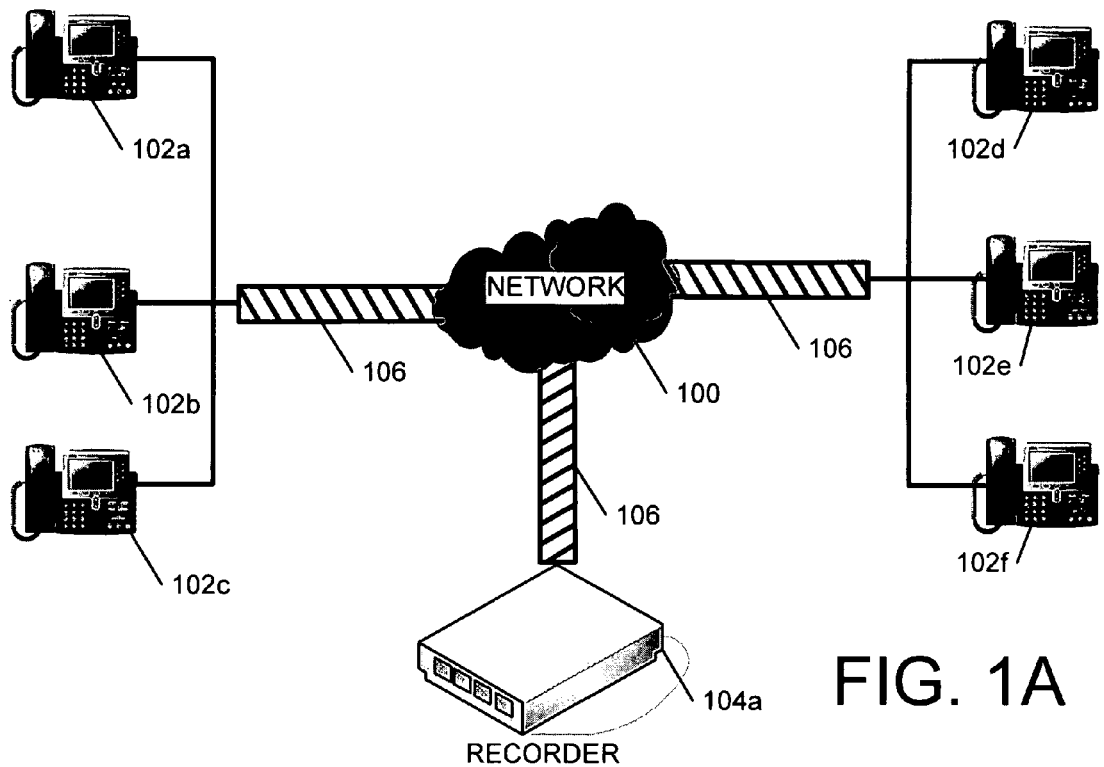
FIG. 1A is an exemplary network diagram illustrating a recorder passively coupled to a communications network.

FIG. 1A is an exemplary network diagram illustrating a recorder passively coupled to a communications network. As illustrated in the nonlimiting example of FIG. 1A, network 100, which can include a wide area network (WAN), the Internet or other network, is coupled to communications devices 102a-102f. Also coupled to network 100 is a recorder 104a. As illustrated, the recorder 104a is coupled in a passive implementation to communications devices 102. A passive implementation can include receiving mirrored data from a communication, similar to a passive tap implementation.

As a nonlimiting example, system designers can analyze network traffic through ports or Virtual Local Area Networks (VLANs) by using a System Port Analyzer (SPAN) to send a copy of the communication traffic (mirrored data) to another port on the switch that has been connected to a Remote Monitoring (RMON) probe. In operation, a copy of the data communicated between communications devices 102 may be directed to recorder 104a. Recorder 104a, however, is not a party to the communication and the communications devices 102 do not generally have information related to the presence and operation of recorder 104a.

Also included in the nonlimiting example of FIG. 1A is a network pipeline 106. Network pipeline 106 is included to illustrate that while the configuration of FIG. 1A may provide recording services to a small number of communications devices, as the amount of information to be recorded increases, the network pipeline 106 may be capable of communicating more information than a single recorder can process. As such, the recorder 104a may malfunction, burnout, or otherwise fail to provide the desired recording services.

One should note that while communications devices 102a, 102b, and 102c are directly coupled together and communications devices 102d, 102e, and 102f are coupled directly together, this is a nonlimiting example. As one of ordinary skill in the art will understand, any configuration for providing communications services between communications devices may be implemented. Such a configuration may also be represented with a plurality of communications devices independently coupled to the network 100, however, this too is a nonlimiting example.

Figure 1B:
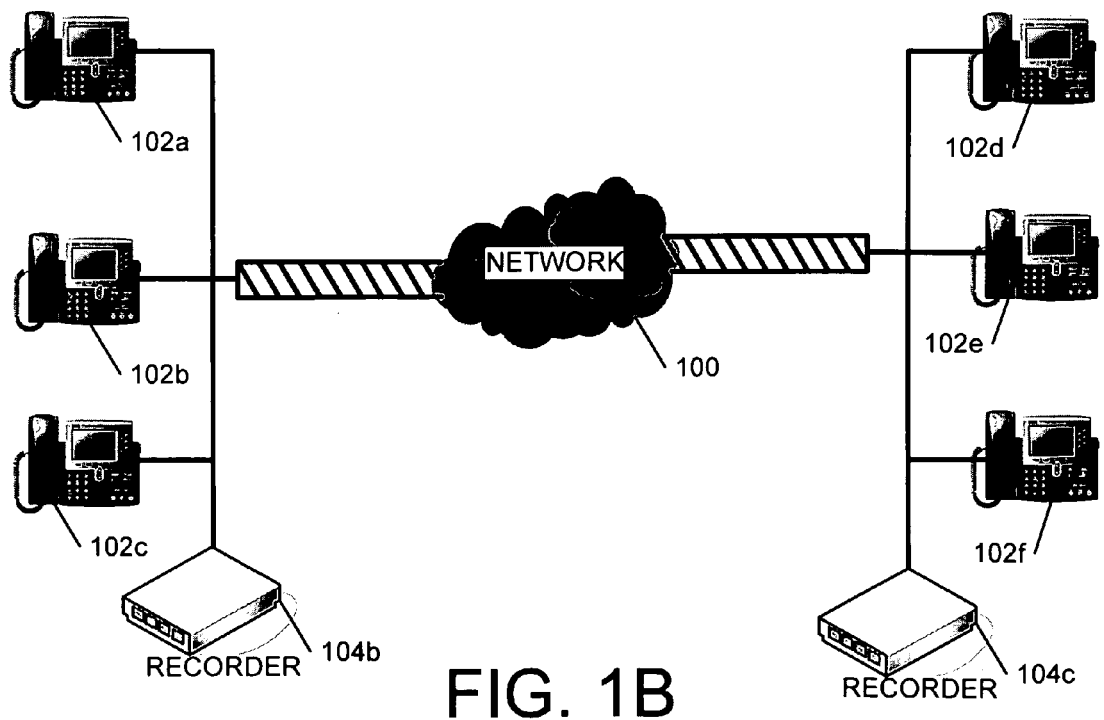
FIG. 1B is an exemplary network diagram illustrating a plurality of recorders passively coupled to a subset of communications devices in the communications network from FIG. 1A.

FIG. 1B is an exemplary network diagram illustrating a plurality of recorders passively coupled to a subset of the communications devices from the communications network from FIG. 1A. As illustrated in the nonlimiting example of FIG. 1B, one solution for recording in a network with a large number of communications devices is to passively tap recorders to a subset of the communications devices 102 in the network 100. More specifically, as illustrated in FIG. 1B, communications devices 102 are coupled to network 100. Additionally, recorder 104b is coupled to communications devices 102a, 102b, and 102c. Similarly, recorder 104c is coupled to communications devices 102d, 102e, and 102f.

While the configuration from FIG. 1B illustrates the ability to provide recording services to all communications devices 102 in FIG. 1B, this configuration can result in problems when recording demands are not evenly distributed. As a nonlimiting example, if communications devices 102a, 102b, and 102c are responsible for 80% of all recordings, then recorder 104b is recording 80% of the network traffic. As such, recorder 104b may reach its storage limit and/or be subject to malfunction due to the large number of recordings. Similarly, recorder 104c will be responsible for only 20% of the recordings (in this nonlimiting example) and may be under-utilized for its capabilities.

Figure 2:
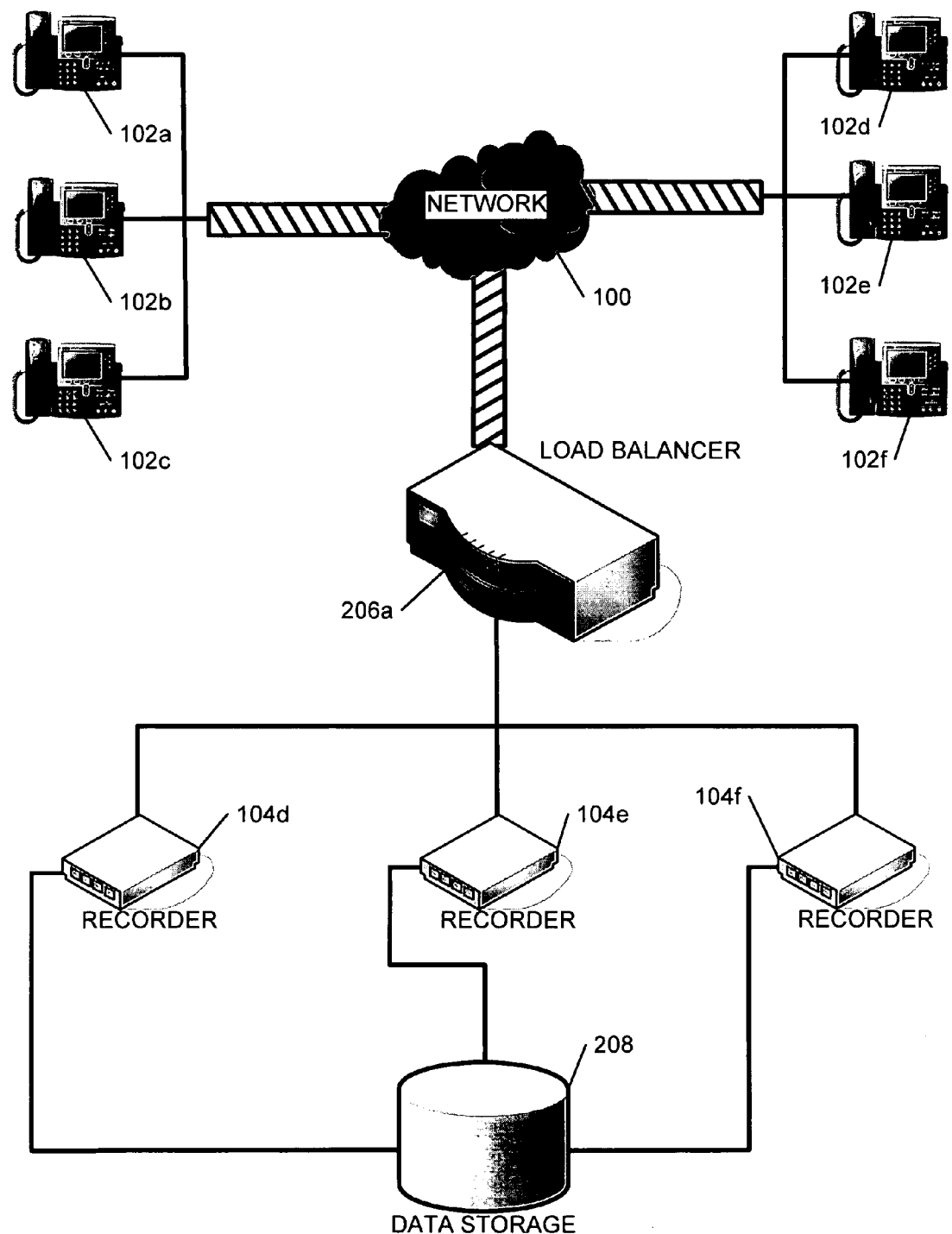
FIG. 2 is an exemplary network diagram illustrating an embodiment of a load balancer coupled to a plurality of recorders for the network from FIG. 1A.

FIG. 2 is an exemplary network diagram illustrating a load balancer coupled to a plurality of recorders for the network from FIG. 1A. More specifically, the nonlimiting example of FIG. 2 illustrates communications devices 102 coupled to network 100. Similar to the configuration from FIG. 1A, the recording traffic (at least a portion of the time) can be generally too large for any one recorder. Additionally, a network administrator may desire to control bandwidth usage by routing recording traffic to a particular recorder(s). As such, a plurality of recorders 104d, 104e, and 104f may be coupled to the network 100 via a load balancer 206. Similar to the configuration from FIG. 1A, the recorders 104d, 104e, and 104f are configured for passive recording of mirrored traffic. Also coupled to the load balancer is a data storage unit 208.

As a nonlimiting example, in operation, a user on communications device 102a can initiate a communication with a user on communications device 102d. One of the users, a system administrator, and/or a third party may desire that the communication be recorded. To facilitate the recording, data is communicated to the load balancer 206 during the communication. The load balancer 206 can be configured to receive the data for recording and route the received data to one or more of the recorders 104d, 104e, and 104f. As data from different communications (and/or different streams of the same communication) is received, the load balancer 206 can determine to which recorder that data is routed. This determination can be made based on a balancing algorithm, such as a round robin algorithm, weighted round robin algorithm, a source-destination algorithm, or other algorithm, as discussed below.

Using a round robin algorithm with three recorders as illustrated in FIG. 2, the following call distribution can be achieved.

TABLE 1

Round Robin

| Calls Active | Recorder 104d | Recorder 104e | Recorder 104f |
|---|---|---|---|
| 0 | 0 | 0 | 0 |
| Call1 | Call1 | 0 | 0 |
| Call1, Call2 | Call1 | Call2 | 0 |
| Call1, Call3 | Call1 | 0 | Call3 |
| Call1, Call3, Call4 | Call1, Call4 | 0 | Call3 |
| Call3, Call4, Call5 | Call4 | Call5 | Call3 |
| Call3, Call4 | Call4 | 0 | Call3 |
| Call3 | 0 | 0 | Call3 |

As illustrated, as communications are received at the load balancer, the round robin algorithm can automatically route calls to a recorder in a manner that provides a substantially balanced workload to each recorder. More specifically, the round robin algorithm can be configured to allocate calls based on past recorder utilization. In other words, the round robin algorithm can be configured to route the most recently received call to recorders in a continuously repeating sequence. While the round robin algorithm may be desirable in certain configurations, a weighted round robin algorithm may be used to route recording traffic in other configurations.

TABLE 2

Weighted Round Robin

| Calls Active | Recorder 104d | Recorder 104e | Recorder 104f |
|---|---|---|---|
| 0 | 0 | 0 | 0 |
| Call1 | Call1 | 0 | 0 |
| Call1, Call2 | Call1 | Call2 | 0 |
| Call1, Call3 | Call1 | 0 | Call3 |
| Call1, Call3, Call4 | Call1 | Call4 | Call3 |

TABLE 2-continued

Weighted Round Robin

| Calls Active | Recorder 104d | Recorder 104e | Recorder 104f |
|---|---|---|---|
| Call3, Call4, Call5 | Call5 | Call4 | Call3 |
| Call3, Call4 | 0 | Call4 | Call3 |
| Call3 | 0 | 0 | Call3 |

The call distribution in Table 2 shows that the weighted round robin algorithm considers the load on each of the recorders before routing the communication data (e.g., real time packet (RTP)) flow to the recorders. In other words, the algorithm can be configured to determine the recorder(s) that are currently utilized less than other recorders. This can result in providing a substantially balanced distribution of calls across the recorders, in that the least utilized recorder receives the call. If there are two (or more) recorders with equal current utilization, the weighted round robin algorithm can route the newly received call to the recorder next in the sequence (similar to the round robin algorithm discussed above). This means that, depending on the particular configuration, hard-disk space for storing recording data (e.g., at data storage 208) can be utilized in a roughly even manner.

TABLE 3

Source-Destination

| Calls Active | Recorder 104d | Recorder 104e | Recorder 104f |
|---|---|---|---|
| 0 | 0 | 0 | 0 |
| Call1 | Call1 | 0 | 0 |
| Call1, Call2 | Call1 | Call2 | 0 |
| Call1, Call3 | Call1 | 0 | Call3 |
| Call1, Call3, Call4 | Call1 | 0 | Call3 |
| Call3, Call4, Call5 | Call5 (assuming call1 finishes before call5 starts and is made between the same extension and gateway as call 1) | Call4 | Call3 |
| Call3, Call4, Call5, Call6, Call7 | Call5, Call6, Call7 | Call4 | Call3 |
| Call3, Call4 | 0 | Call4 | Call3 |
| Call3 | 0 | 0 | Call3 |

While the above described round robin algorithm and weighted round robin algorithm can be utilized for many recording environments, when call data is received at the load balancer in different data streams (i.e., the communication data sent from a communications device is received in a different data stream than the communication data received at the communications device), a source-destination algorithm may be used. More specifically, if the endpoint of a VoIP call (e.g., communications device 102) receives and sends the communications data (e.g., RTP data) on different port numbers, the source-destination load balancing algorithm may be used. The source destination algorithm can more easily handle recording in such an environment, as call streams from the same communication can be sent to different recorders and provide a roughly even distribution of calls for the recorders.

Figure 3:
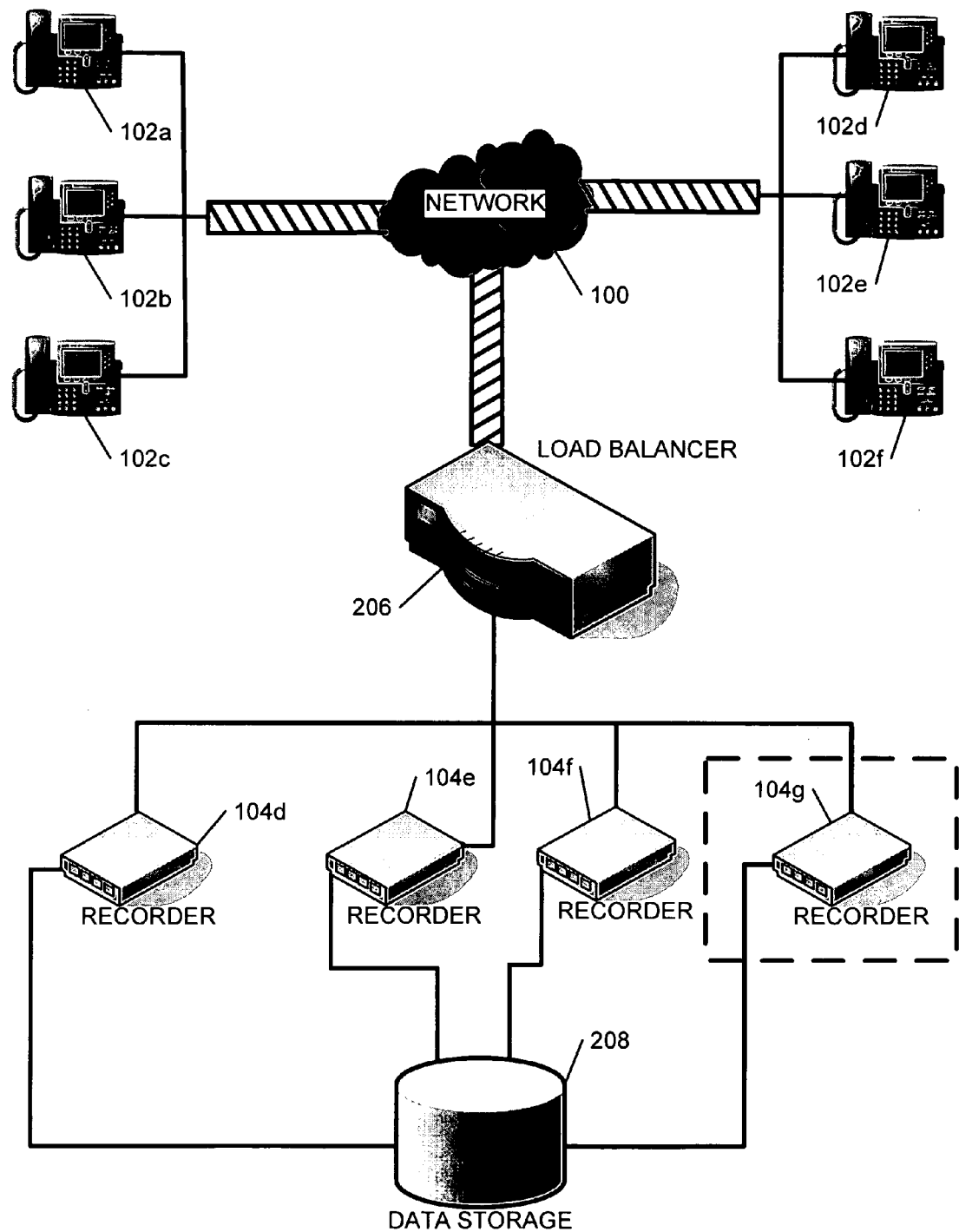
FIG. 3 is an exemplary network diagram illustrating use of a fail-over recorder in a network configuration, such as the configuration from FIG. 2.

FIG. 3 is an exemplary network diagram illustrating use of a fail-over recorder in a network configuration, such as the configuration from FIG. 2. More specifically, in addition to recorders 104*d*, 104*e*, and 104*f*, the network configuration of FIG. 3 also includes a fail-over recorder 104*g*. This recorder can be configured with the same functionality recorders 104*d*, 104*e*, and 104*f*, however, this recorder may be configured for use when one or more of the recorders 104*d*, 104*e*, and 104*e* malfunction (or otherwise are not being used). In such a scenario, the fail-over recorder 106*g* can automatically begin recording in response to detecting the malfunction occurs. Additionally, if the control data is being provided to all recorders (including fail-over recorder 106*g*), the transition to using the fail-over recorder 106*g* can be made with minimal data loss.

Additionally, while the fail-over recorder can be kept idle when there is no recorder malfunction, this is a nonlimiting example. More specifically, other embodiments can utilize at least a portion of the fail-over recorder's functionality when the fail-over recorder 106*g* is not otherwise in use. Additionally, while FIG. 3 illustrates the fail over recorder in N+1 fail-over protection (where N represents the total number of recorders, and 1 indicates the number of recorders available for fail-over), as one of ordinary skill in the art will understand, this disclosure can be interpreted to include N+M fail-over protection, where M can be any number of recorders available for fail-over. One should also note that with the above described fail-over protection employed, a network administrator may remove the malfunctioning recorder without affecting the remaining recorders 104, load balancer 206, and/or other network components.

Additionally, one should note that fail-over protection can be utilized in response to the load balancer 206 detecting a malfunction with a recorder (e.g., dead network cable). Other embodiments can include logic related to the recorder 104 for sending a signal to the load balancer 206 indicating that the recorder is to be taken out of service. Still other embodiments include logic related to the recorder 104 being configured to disable the connection with the load balancer 206 such that the load balancer 206 can detect that the link to that recorder 104 is dead.

Additional elements to the above described network configuration can include health checking logic (and/or watchdogs), where failure of one or more logic components (e.g., software) may be used to signal to the load balancer 206 to take that recorder out of service. Still other embodiments include using redundant recorders to smooth the load of data (e.g., receiving roughly equal amounts of data at each recorder) even when no recorder has failed. This can provide an increased use of available resources and ensure that all recorders are functional. In such a configuration, no one recorder is the "fail-over recorder," as any and/or all of the recorders can provide the desired fail-over protection. This can provide more redundant capacity into the network and provide greater performance since normal operational traffic is spread evenly across the available resources.

One should also note that in at least one embodiment call data can be preserved when a call is transferred from a first recorder to a second recorder. As a nonlimiting example, recorder 104*f* can be configured to record a communication between communications device 102*a* and communications device 102*f*. If a determination is made that it is more preferable that recorder 104*g* record the communication (e.g., recorder 104*f* fails, bandwidth issues with recorder 104*f*, etc.) the load balancer can be configured to send subsequently received data to recorder 104*g*. As one of ordinary skill in the art will understand, recorder 104*f* recorded a portion of the communication and recorder 104*g* recorded a portion of the communication. As such, the configuration of FIG. 3 can be configured to stitch together the two portions of the recorded communication such that, upon retrieval, the recorded data is viewed as a single recording. Additionally, depending on the particular configuration, this concept can be extended to any number of recorders.

Figure 4:
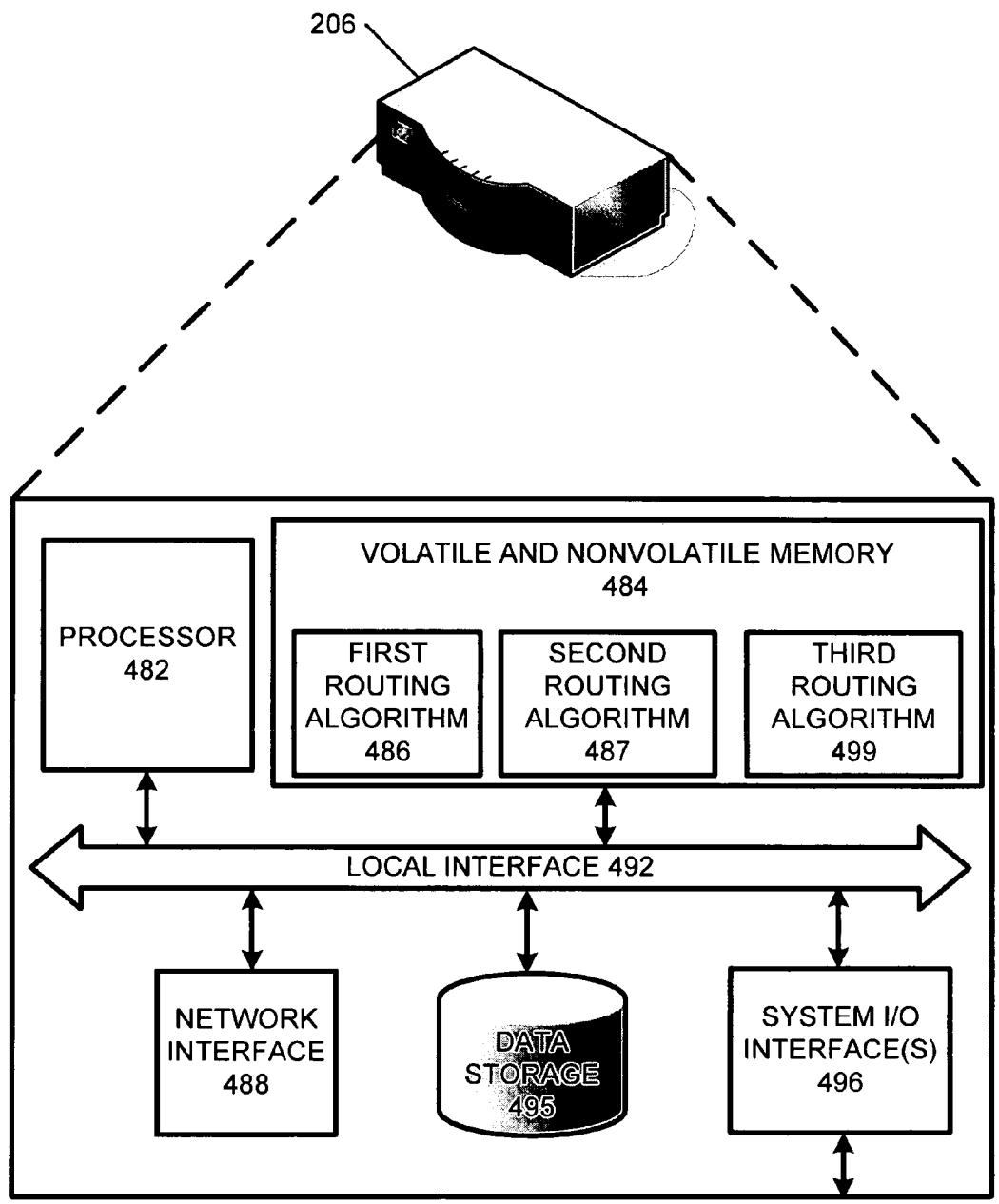
FIG. 4 is an exemplary block diagram illustrating various components in an exemplary embodiment of an IP analyzer.

FIG. 4 is an exemplary block diagram illustrating various components in the load balancer from FIG. 2. Generally, in terms of hardware architecture, as shown in FIG. 4, the load balancer 206 includes a processor 482, volatile and nonvolatile memory 484, data storage 495, and one or more input and/or output (I/O) device interface(s) 496 that are communicatively coupled via a local interface 492. The local interface 492 can include, for example but not limited to, one or more buses or other wired or wireless connections. The local interface 492 may have additional elements, which are omitted for simplicity, such as controllers, buffers (caches), drivers, repeaters, and receivers to enable communications. Further, the local interface 492 may include address, control, and/or data connections to enable appropriate communications among the aforementioned components. The processor 482 may be a hardware device for executing software, particularly software stored in volatile and nonvolatile memory 484.

The processor 482 can be any custom made or commercially available processor, a central processing unit (CPU), an auxiliary processor among several processors associated with the load balancer 206, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80x86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 484 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 484 may incorporate electronic, magnetic, optical, and/or other types of storage media. Note that the volatile and nonvolatile memory 484 can have a distributed architecture, where various components are situated remote from one another, but can be accessed by the processor 482. Additionally volatile and nonvolatile memory 484 can also include an first routing software 486, second routing software 487 and/or third routing software 499. Additionally, the volatile and nonvolatile memory can include an operating system (not shown), depending on the particular configuration.

A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; or (g) an appliance-based operating system, such as that implemented in handheld computers or personal data assistants (PDAs) (e.g., PalmOS® available from Palm® Computing, Inc., and Windows CE® available from Microsoft® Corporation). The operating system can be configured to control the execution of other computer programs and provides scheduling, input-output control, file and data management, memory management, and communication control and related services.

A system component embodied as software may also be construed as a source program, executable program (object code), script, or any other entity comprising a set of instructions to be performed. When constructed as a source program, the program is translated via a compiler, assembler, interpreter, or the like, which may or may not be included within the volatile and nonvolatile memory 484, so as to operate properly in connection with the Operating System.

The Input/Output devices that may be coupled to system I/O Interface(s) 496 may include input devices, for example but not limited to, network interfaces, a keyboard, mouse, scanner, microphone, etc. Further, the Input/Output devices may also include output devices, for example but not limited to, network interfaces, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc. Additionally, a display interface (not shown) may facilitate connection to a display monitor or other display device.

If the load balancer 206 includes a personal computer, workstation, or the like, the software in the volatile and nonvolatile memory 484 may further include a basic input output system (BIOS) (omitted for simplicity). The BIOS is a set of software routines that initialize and test hardware at startup, start the Operating System, and support the transfer of data among the hardware devices. The BIOS is stored in ROM so that the BIOS can be executed when the load balancer 206 is activated.

When the load balancer 206 is in operation, the processor 482 is configured to execute software stored within the volatile and nonvolatile memory 484, to communicate data to and from the volatile and nonvolatile memory 484, and to generally control operations of the load balancer 206 pursuant to the software. Software in memory, in whole or in part, are read by the processor 482, perhaps buffered within the processor 482, and then executed.

Additionally, as stated above, while reference in FIG. 4 is made to load balancer 206, similar architecture can apply to one or more of the components in the communications network. More specifically, depending on the particular configuration, a switch, recorder, communications device, etc. may include one or more of the components illustrated in FIG. 4. Further due to the differing functionality for these devices, a variance in the hardware and/or software components may be expected.

Figure 5:
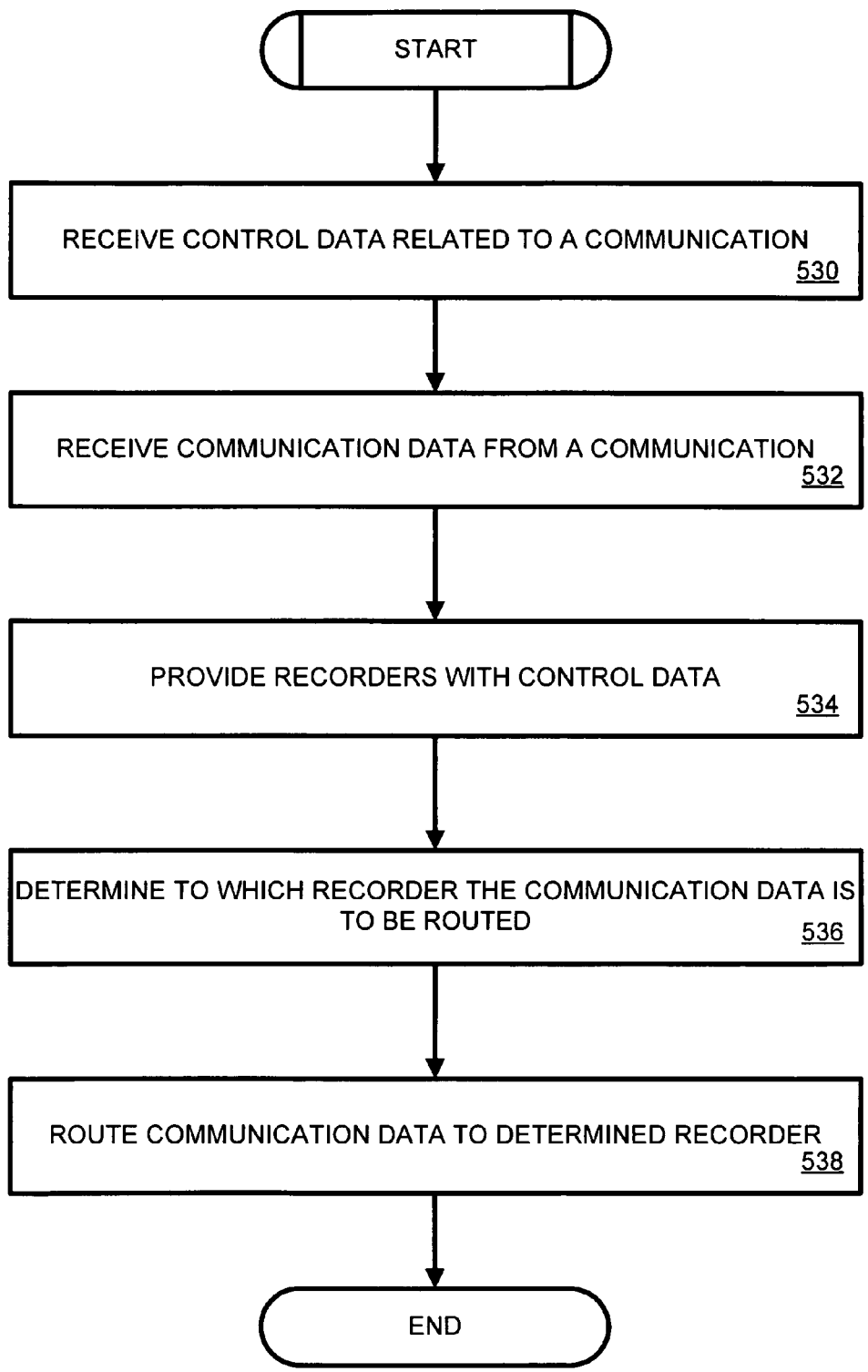
FIG. 5 is a flowchart illustrating exemplary steps for passively recording data from a communication in the network from FIG. 2.

FIG. 5 is a flowchart illustrating an embodiment of a method or exemplary steps for passively recording data from a communication in the network from FIG. 2. The first step in the nonlimiting example of FIG. 5 is to receive control data related to a communication (block 530). More specifically, referring back to FIG. 2, in at least one embodiment, when a user operating communications device 102*b* establishes a communication with a user on communications device 102*e*, communication data is sent between the two communications devices (and to load balancer 206). The communication data can include data related to voice, pictures, video, and/or other data for facilitating the communication. In addition to the communication data, control data may also be sent between the communication devices 102 (and load balancer 206). The control data can include data related to the dialed number, the IP address of the communications devices 102, the time of call, and/or other data.

The load balancer 206 can then receive communication data from a communication (block 532), as discussed above. Upon receiving the control data from any of a plurality of communications that may be taking place in the network, (as illustrated in block 530), the load balancer 206 can be configured to provide one or more of the recorders 104 with the control data. In at least one embodiment the load balancer 206 provides all recorders 104*d*, 104*e*, and 104*f* with the control data (block 534). The load balancer 206 can then determine to which recorder 104 the communication data is to be routed (block 536). As discussed above, depending on the particular embodiment, any of a plurality of routing algorithms can be used, including but not limited to the round robin algorithm, the weighted round robin algorithm, and the source-destination algorithm. Once the recorder is determined, the load balancer 206 can route the communication data to the determined recorder.

Figure 6:
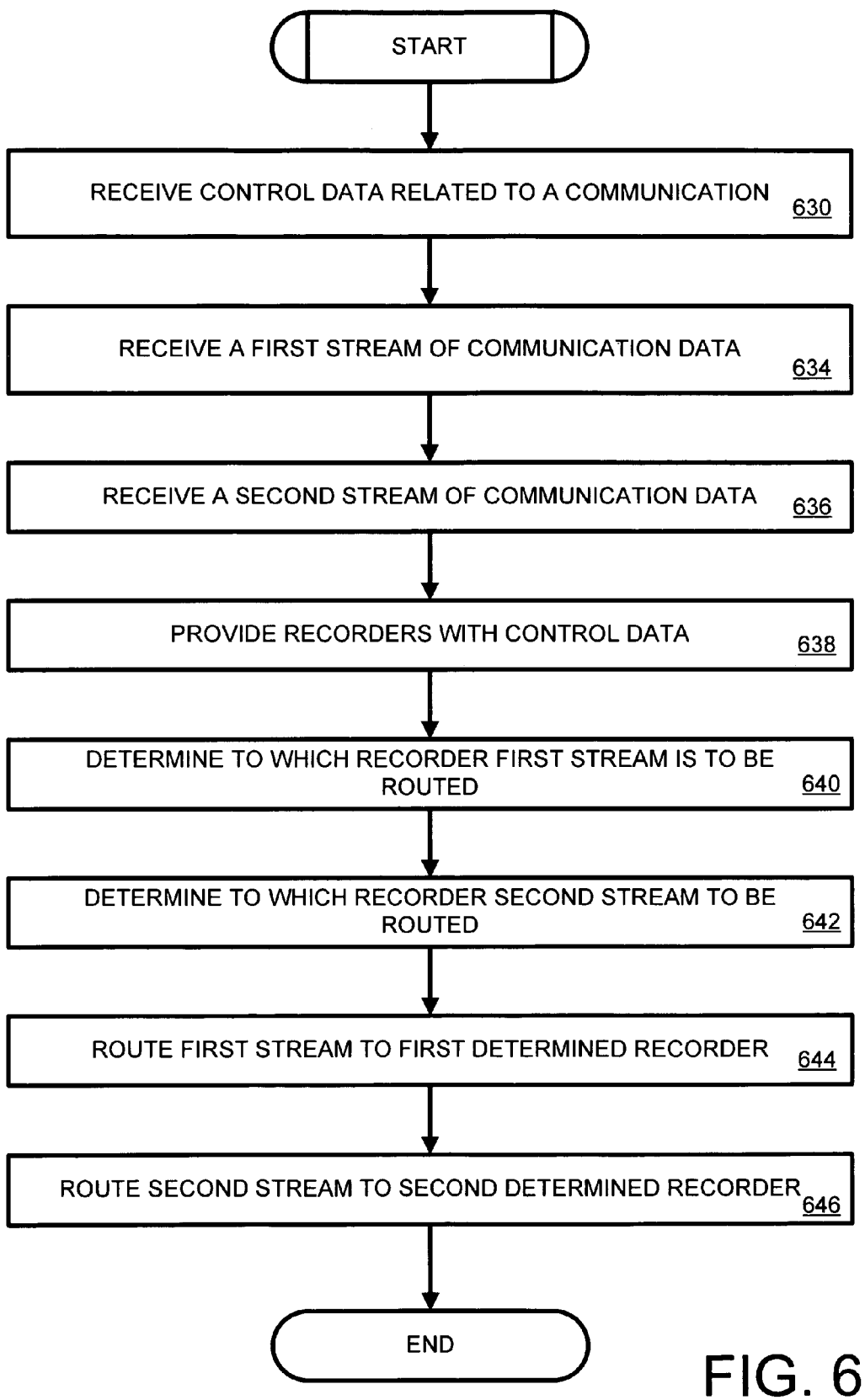
FIG. 6 is a flowchart illustrating exemplary steps for passively recording data in independent streams.

FIG. 6 is a flowchart illustrating exemplary steps for passively recording data in independent streams, similar to the flowchart from FIG. 5. The first step in the nonlimiting example of FIG. 6 is for the load balancer 206 to receive control data related to a communication (block 630). Next, the load balancer 206 can receive a first stream of communication data (block 634). The load balancer 206 can then receive a second stream of communication data (block 636). As discussed above, depending on the particular configuration, the communication can be received by the load balancer 206 via one stream, or by more than one stream. In this particular nonlimiting example, the communication data is received in a plurality of different streams.

The load balancer 206 can then provide the recorders with the received control data (block 638). The load balancer 206 can then determine to which recorder the first communication stream data is to be routed (block 640) and determine to which recorder the second communication stream is to be routed (block 642). The load balancer 206 can then route the first communication stream to the first determined recorder (block 644) and route the second communication stream to the second determined recorder (block 646).

Figure 7:
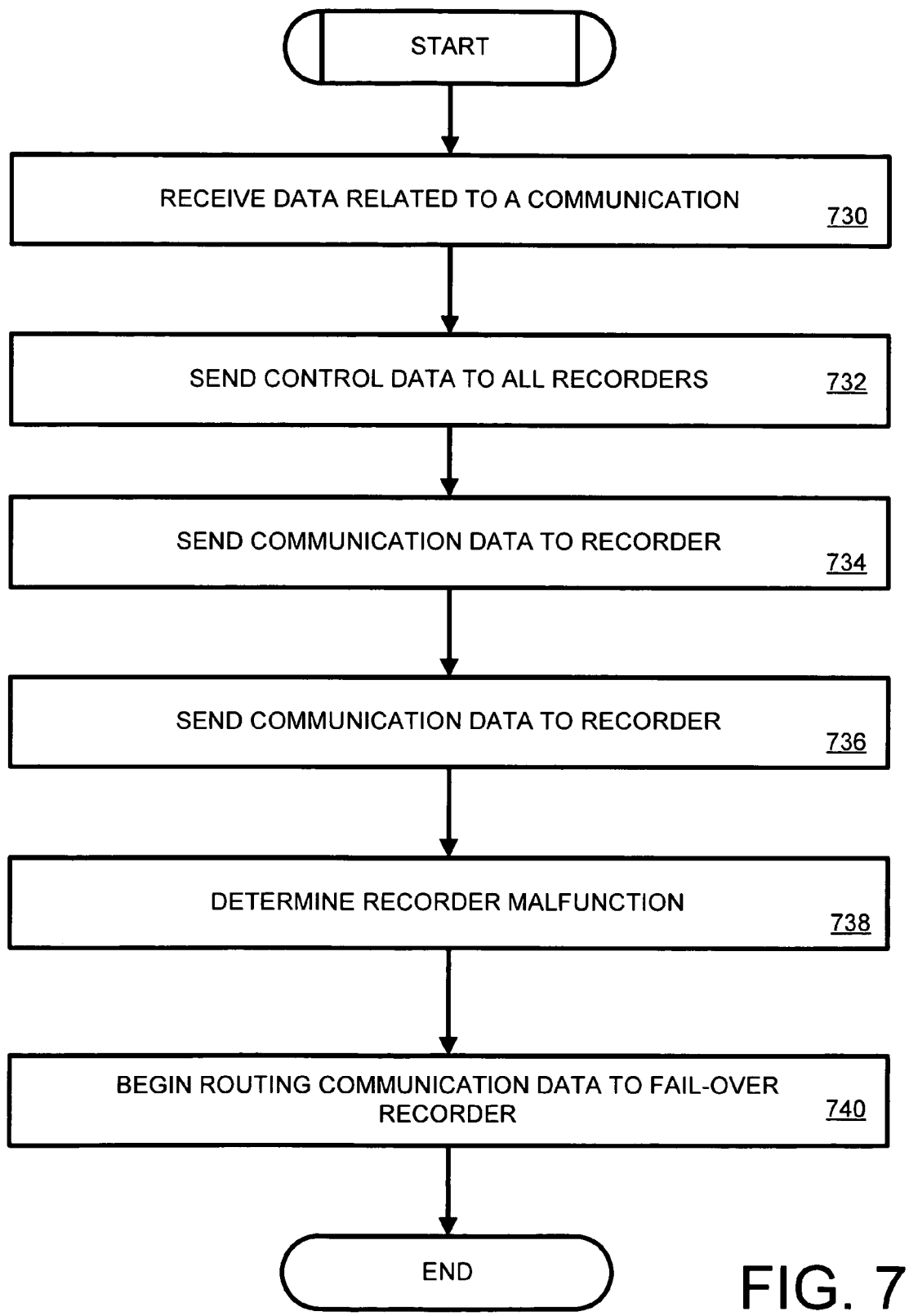
FIG. 7 is a flowchart illustrating exemplary steps for providing fail-over functionality in a network, such as the network from FIG. 3.

FIG. 7 is a flowchart illustrating exemplary steps for providing fail-over functionality in a network, such as the network from FIG. 3. The first step in the nonlimiting example of FIG. 7 is for the load balancer 206 to receive data related to a communication (block 730). As discussed above, the data can include control data, as well as communication data. Once the data is received, the load balancer can send the received control data to all recorders 104 coupled to the load balancer 206 (block 732). The load balancer 206 can then determine to which recorder to send the received communication data (block 734) and then send communication data to a recorder (block 736). The load balancer 206 can then detect a malfunction with the recorder (block 738). The load balancer 206 can make this determination in any of a plurality of ways including the load balancer 206 detecting a malfunction with a recorder (e.g., dead network cable). Other embodiments can provide that logic related to the recorder 104 sends a signal to the load balancer 206 indicating that the recorder is to be taken out of service. Still other embodiments provide that logic related to the recorder 104 disables the connection with the load balancer 206 such that the load balancer 206 can detect that the link to that recorder 104 is dead. Regardless of the technique for detecting the malfunction, the recorder can then begin routing the communication data to the fail-over recorder (block 740).

One should also note, that while the load balancer can be configured to detect errors in recorders, at least one embodiment can include a recorder with logic to self detect errors with the recorder. As a nonlimiting example, a recorder can be configured with logic for monitoring various hardware and/or software components using Intelligent Platform Management Interface (IPMI) and/or other protocol.

Link Protector

Figure 8:
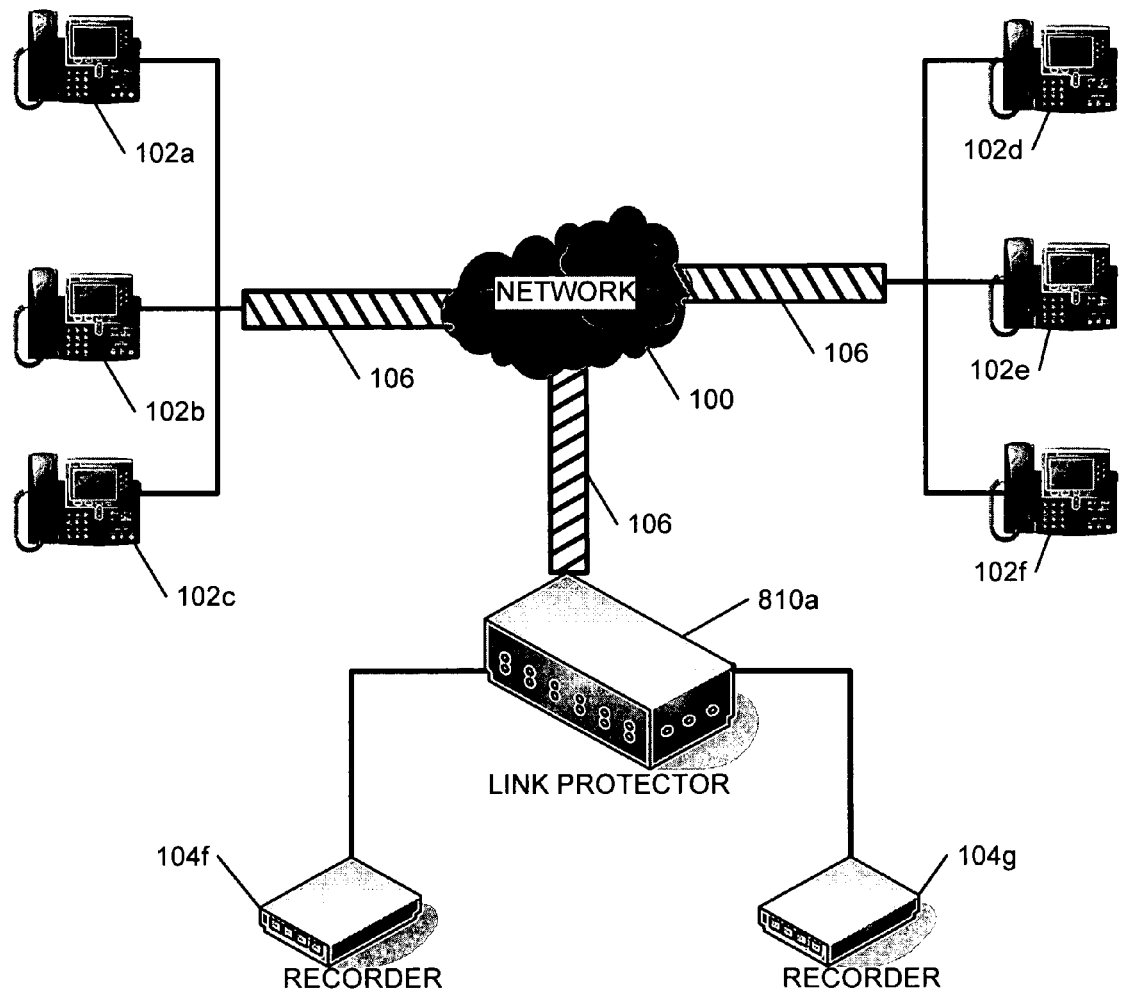
FIG. 8 is a network diagram illustrating an exemplary configuration with an embodiment of a link protector.

FIG. 8 is a network diagram illustrating an exemplary configuration with a link protector. Similar to the configuration from FIG. 2, the configuration of FIG. 8 includes a plurality of communications devices 102 coupled to network 100. In such a configuration, a user on communications device 102*a* can initiate a communication with a user on communications device 102*f*. Once the communication session commences (or anytime thereafter), mirrored data can be sent for recording. As discussed above with respect to FIGS. 1A and 1B, a recorder can be passively coupled to the communications network 100 to facilitate this recording. While coupling a recorder to the network as depicted in FIGS. 1A and 1B may provide the desired recording services, a problem can result if one of the recorders fails or otherwise malfunctions. In such a scenario, data can be lost until the malfunction is addressed.

The configuration from FIG. 8, however, illustrates an embodiment of a network for addressing hardware malfunction in such a scenario. More specifically, by passively coupling a link protector 810*a* to the network 100, mirrored data can be received by the link protector 810*a*. The link protector 810*a* can route the received data to the primary recorder (in this nonlimiting example, recorder 104*f*). If a hardware malfunction occurs (such as a severance of the link between recorder 104*f* and link protector 810*a*), the link protector can automatically route subsequently received data to the secondary recorder 104*g*. By routing subsequently received data to the secondary recorder 104*g*, recording can continue with minimal data loss.

Figure 9:
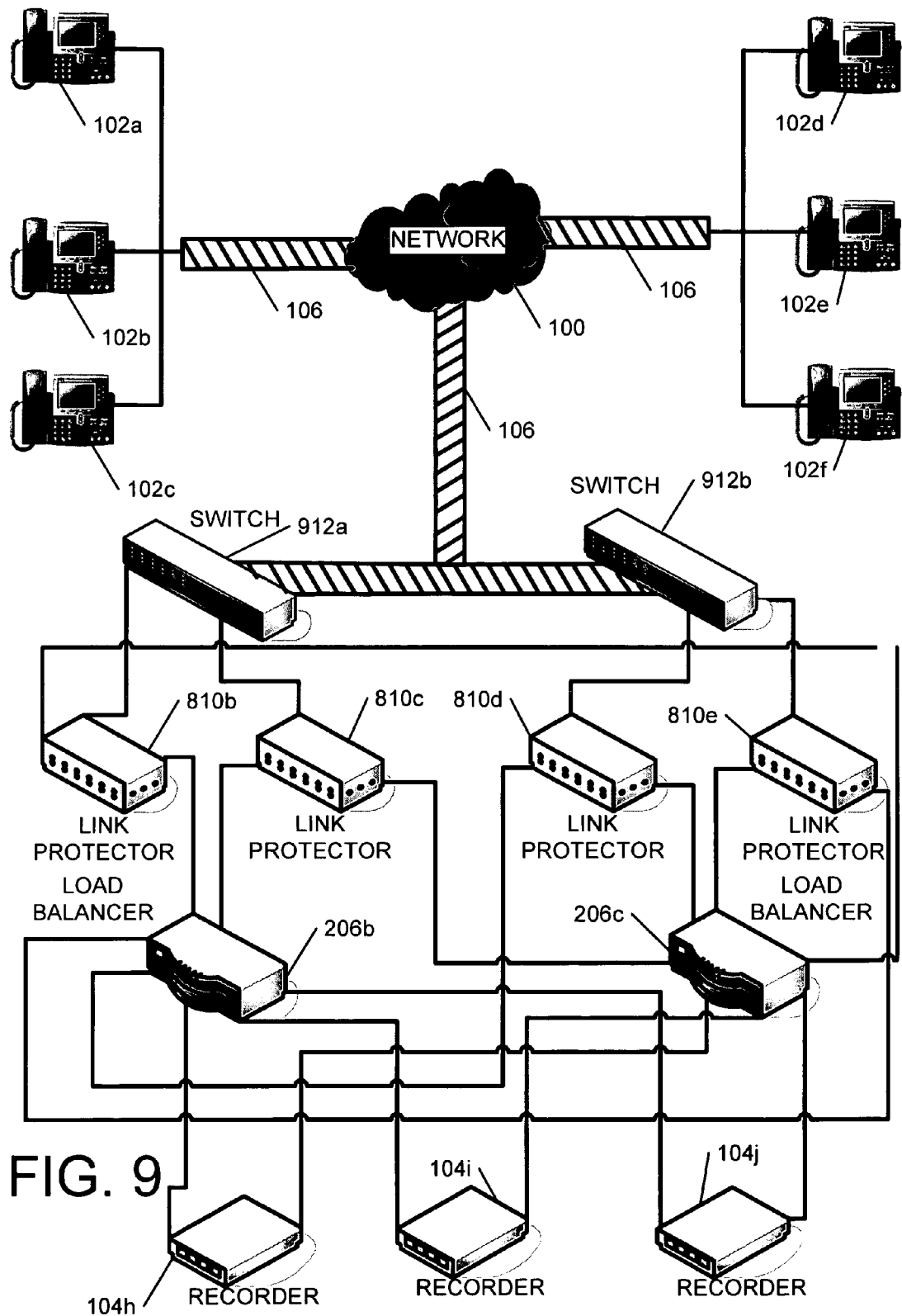
FIG. 9 is a network diagram illustrating another exemplary configuration with an embodiment of a link protector coupled to an embodiment of a load balancer, such as the load balancer from FIG. 2.

FIG. 9 is a network diagram illustrating another exemplary configuration with a link protector coupled to a load balancer, such as the load balancer from FIG. 2. Similar to the configuration from FIG. 8, a plurality of communications devices 102 is coupled to communications network 100. Also coupled to communications network 100 are switches 912*a* and 912*b*, which can provide connection services between communications devices 102. Switch 912*a* is coupled to link protector 810*b* and link protector 810*c*. Link protector 810*b* is coupled to load balancer 206*b*, as well as load balancer 206*c*. Similarly, link protector 810*c* is coupled to load balancer 206*b* and load balancer 206*c*. In at least one configuration, link protector 810*b* can be configured to receive communication data related to the current communication, while link protector 810*c* is configured to receive control data. As discussed above, communication data can include voice, video, picture, and/or other data that facilitates the communication between communications devices 102. Control data can include other data for indicating various attributes of the communication, such as data related to the dialed number, the IP address of the communications devices 102, the time of call, and/or other data. Link protectors 810*d* and 810*e* are each coupled to load balancer 206*b* and load balancer 206*c* and may have similar functionality to link protectors 810*b* and 810*c*. Load balancers 206*b* and 206*c* are coupled to recorders 104*h*, 104*i* and 104*j*.

In operation, a call is initiated between communications device 102*c* and communications device 102*d*. This communication can be facilitated by switch 912*a* (depending on the particular configuration 912 may also facilitate the communication). Link protector 810*b* receives communication data and sends the received communication data to load balancer 206b (which is the primary load balancer for switch 912a). Similarly, link protector 810c receives control data and sends this data to load balancer 206b.

With respect to the configuration of FIG. 9, if the link between link protector 810b and load balancer 206b is severed, link protector 810b can automatically begin sending subsequently received communications data to load balancer 206c. Similarly, if the link between 810e and load balancer 206c is severed, the link protector 810e can route subsequently received control data to load balancer 206b (which is the secondary load balancer for switch 912b), if this data is not already being sent to load balancer 206b. Similar routing can occur with link protectors 810c and 810d.

Regardless of the status of links between load balancers 206 and link protectors 810, the load balancers 206 can receive data from the link protectors 810 and distribute this data to recorders 104 according to any of a plurality of algorithms, as indicated above. Also as indicated above, a data storage unit (not shown) can be coupled to recorders 104.

In addition to detecting a hardware malfunction (such as a severed link), link protectors 810 can be configured to "heartbeat" those components coupled to link protectors 810. More specifically, link protector 810b can be configured with logic for determining whether load balancers 206, as well as recorders 104 are functioning. As a nonlimiting example, link protector 810b can be configured to routinely and/or continuously send a status request signal ("heartbeat") to load balancers 206b and 206c. The status request signal can be configured to determine whether the logic in the load balancers 206 is operating properly. Upon receiving an indication of the status of load balancers 206, the link protector 810b can determine whether the load balancers 206 are operating as desired. Similarly, functionality data related to recorders 104 can be determined in a similar fashion. If the link protector determines that a load balancer 206 and/or a recorder 104 are not operating properly, the link protector can route subsequently received data to those components that are operating properly. More specifically, in at least one embodiment, the link protector can be configured to identify a hardware, software, and/or communications issue with a recorder and/or load balancer. As a nonlimiting example, the link protector can be configured with logic, such as (but not limited to) IPMI for determining various issues.

Figure 10:
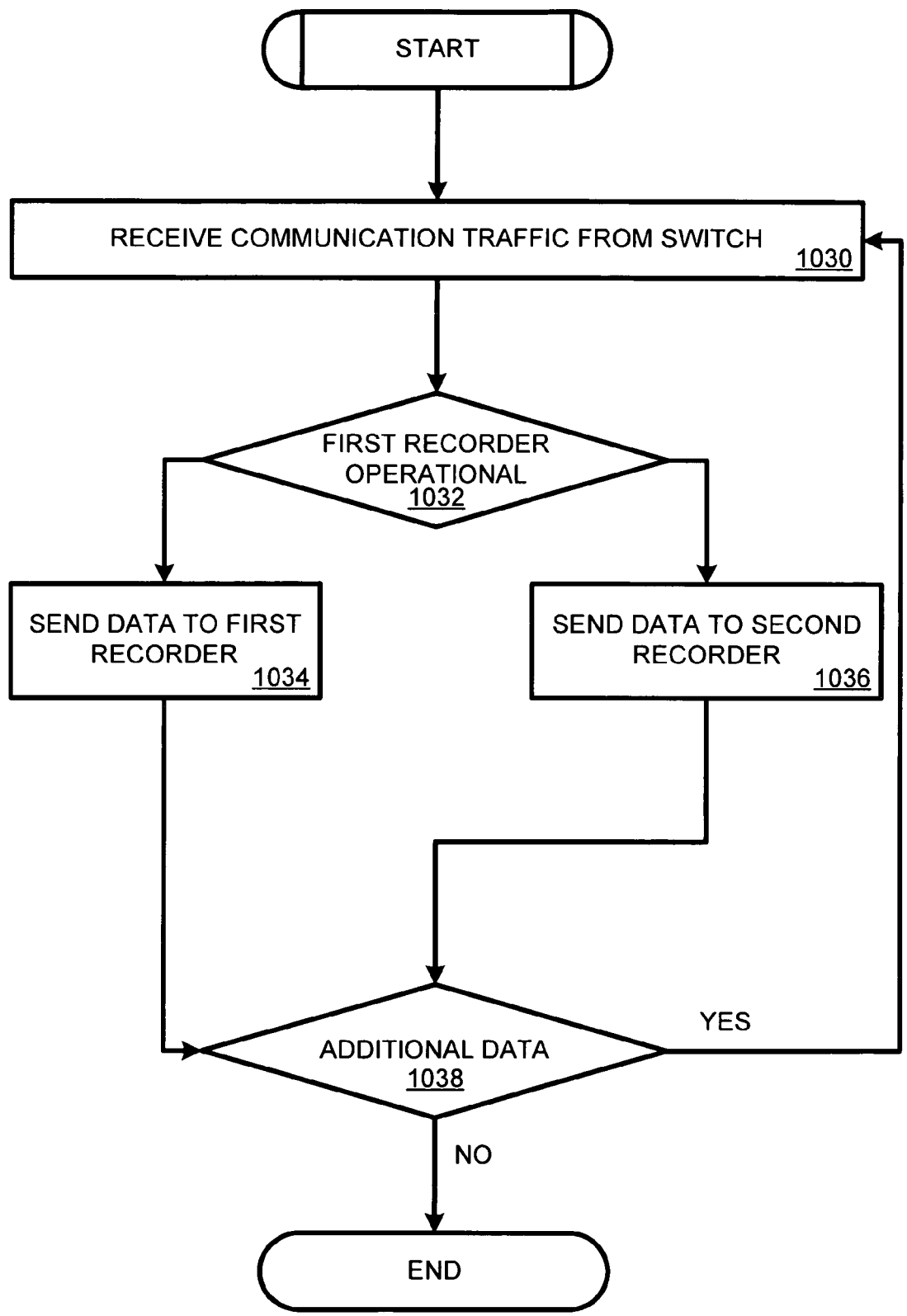
FIG. 10 is a flowchart illustrating exemplary steps for protecting a link in the network from FIG. 8.

FIG. 10 is a flowchart illustrating exemplary steps for protecting a link in the network from FIG. 8. The first step in the nonlimiting example of FIG. 10 is for the link protector 810 to receive communication data from a switch (block 1030). As discussed above, the switch (not shown in FIG. 8) can be configured to send both control data and communication data related to a communication. Once the data is received, the link protector 810a can determine whether the first recorder 104f is operational (block 1032). If the first recorder 104f is operational, the link protector 810a can send at least a portion of the received data to the recorder 104f (block 1034). If the link detector 810a determines that the first recorder 104f is not operational, the link detector 810a can send at least a portion of the received data to the second recorder 104g (block 1036). The link detector 810a can then determine whether there is more data to receive (block 1038). If the link detector 810a determines that there is more data to receive, the flowchart returns to block 1030 and the process begins again.

While the flowchart with respect to FIG. 10 illustrates a configuration where the link detector 810a determines whether the first recorder 104f is operational each time data is received, this is a nonlimiting example. More specifically, in at least one embodiment, if the link protector 810a determines that the first recorder 104f is not operational, the link detector 810a automatically routes subsequently received data to the second recorder 104g without making any determinations. This can continue until the malfunctioning recorder 104f is repaired and/or replaced and the link protector 810a is reset.

Figure 11:
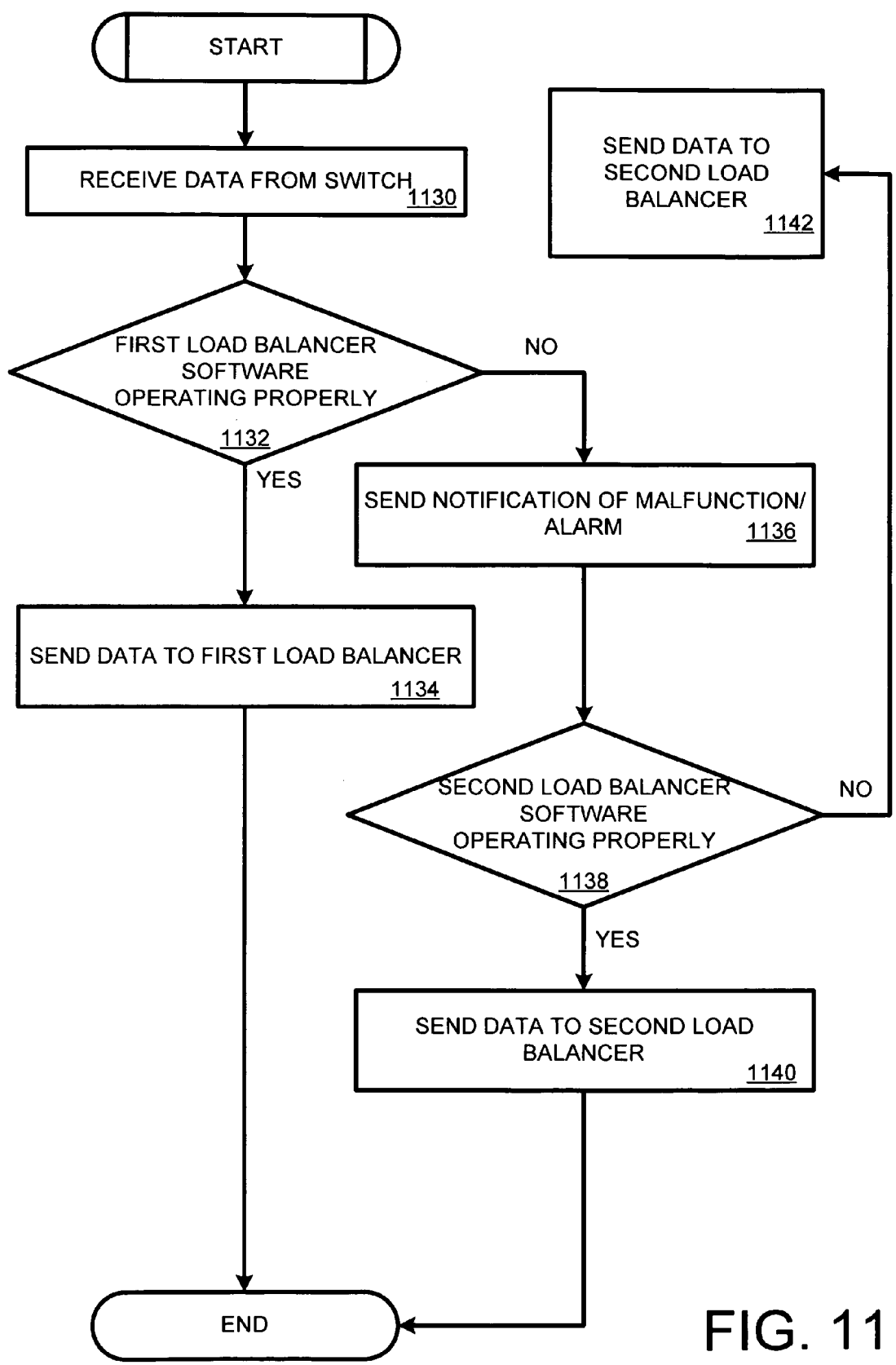
FIG. 11 is a flowchart illustrating exemplary steps for protecting a link in the network from FIG. 9.

FIG. 11 is a flowchart illustrating exemplary steps for protecting a link in the network from FIG. 9. The first step in the nonlimiting example of FIG. 11 is for the link protector 810 to receive data from a switch 912 (block 1130). Upon receiving the data, the link protector can determine whether the first load balancer is operating properly (block 1132). More specifically, depending on the particular configuration, the link protector can determine whether the load balancer has encountered a hardware error, a software error, a communications error, and/or any other issue that could effect recording. If the link protector determines that the first load balancer is operating properly, the link protector can send data to the first load balancer (block 1134). If, on the other hand, the link protector determines that the first load balancer is not operating properly, the link protector can send data related to the malfunction, which can include a signal or alarm (block 1136). The link protector can then determine whether a second load balancer is operating properly (block 1138). If the second load balancer is operating properly, the link protector can send data to the second load balancer (block 1140). If, on the other hand, the link protector determines that the second load balancer is not operating properly, the link protector can send data related to a malfunction (block 1142).

As illustrated in FIG. 11, block 1142 does not flow to an end block. Such a configuration is intended to represent the possibility that the link protector can be configured to provide link protection with any number of load balancers and/or recorders. As one of ordinary skill in the art will understand, blocks similar to blocks 1136, 1138, 1140, and 1142 can be utilized for additional load balancers.

IP Analyzer

Figure 12:
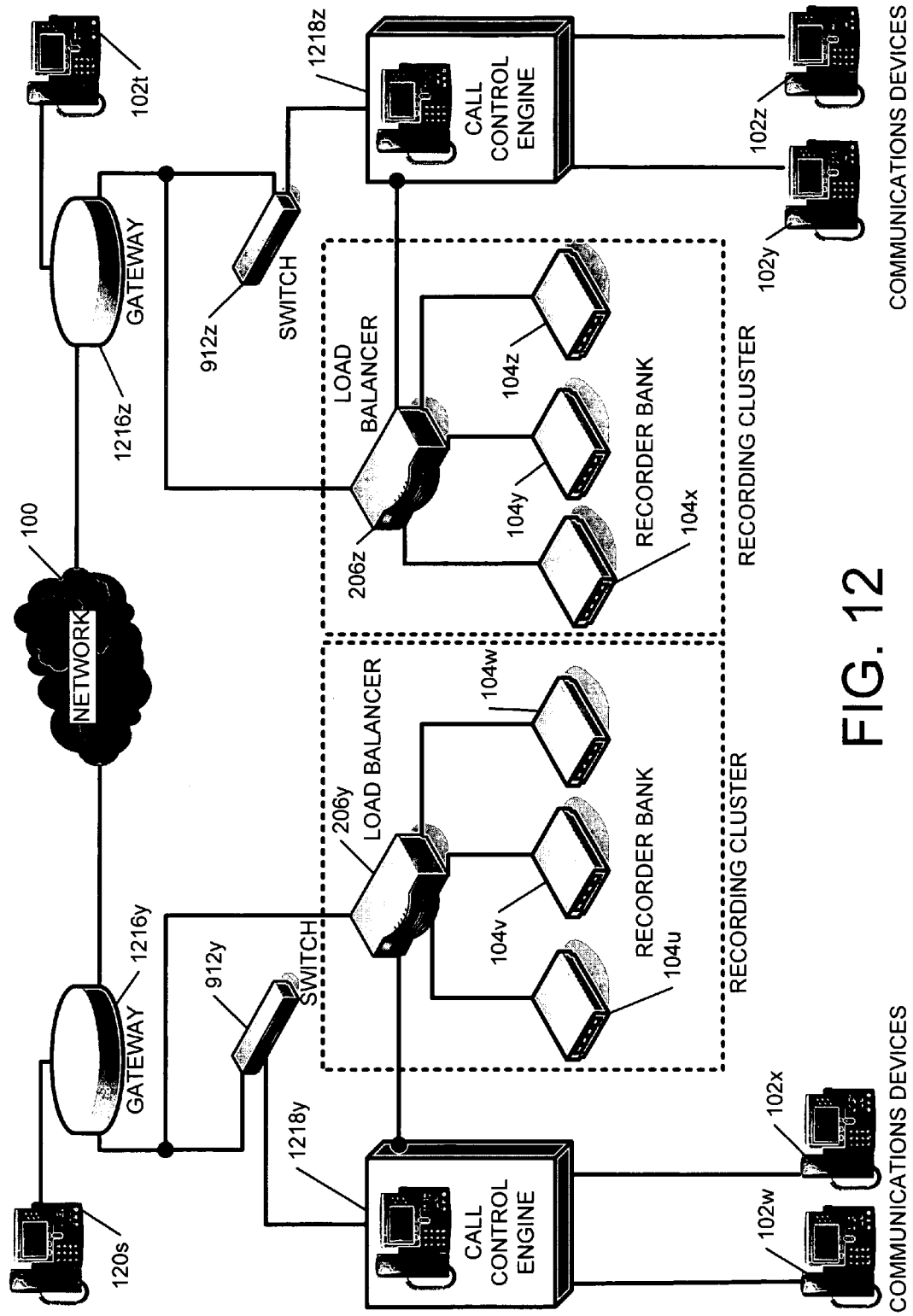
FIG. 12 is an exemplary network configuration illustrating various components that may be used for recording a communication.

FIG. 12 is an exemplary network configuration illustrating various components that may be used for recording a communication. As illustrated, communications network 100 (which can include a WAN, Asynchronous Transfer Mode (ATM) network, the Internet and/or other network) is coupled to gateway 1216y and 1216z. Gateway 1216y is coupled to switch 912y. Similarly, gateway 1216z is coupled to switch 912z. Call control engine 1218y is coupled to switch 912y as well as communications devices 102w and 102x. Call control engine 1218z is coupled to switch 912z and communications devices 102y and 102z. Load balancer 206y is passively coupled to the link between gateway 1216y and switch 912y. Load balancer 206z is passively coupled between gateway 1216z and switch 912z. Load balancer 206y is also coupled to a recorder bank that includes recorders 104u, 104v, and 104w. Load balancer 206z is coupled to a recorder bank that includes recorders 104x, 104y, and 104z. Additionally, load balancer 206y is passively coupled to call control engine 1218y and load balancer 206z is passively coupled to call control engine 1218z. similarly, In operation, if a caller initiates a communication from communications device 102w to communications device 102s (which is external to the network of FIG. 12 and may be coupled to gateway 1216y via a Public Switched Telephone Network (PSTN), the Internet, and/or other network), gateway 1216y can facilitate the communication. As data is communicated between the communications devices 102w and 102s, load balancer 206y receives mirrored communication data sent between gateway 1216y and switch 912y. As discussed above, load balancer 206y can be configured to send the received communication data to one or more of the recorders 104u, 104v, and 104w. Similarly, call control engine 1218y receives control data related to the communication. Load balancer 206y receives mirrored control data from the call control engine 1218y. Load balancer 206y can then provide the received control data to one or more recorders 104u, 104v, and 104w.

While such a configuration may enable recording of communications between two communications devices being serviced by the same gateway, problems may occur for recording across a plurality of gateways. More specifically, if a user on communications device 102w desires to communicate with a user on communications device 102t (which is external to the network of FIG. 12 and may be coupled to gateway1216z via a PSTN, the Internet, and/or to the network), recording may be a difficult task. As a nonlimiting example, by initiating a communication from communications device 102w, the data is communicated via network 100 to gateway 1216z. Gateway 1216z sends the received data to communications device 102t.

However, in recording the communication, load balancer 206z receives mirrored data sent from gateway 1216z. A problem can occur in sending the control data to the load balancer 206z, in that the call control engine 1218z (from which the load balancer 206z generally receives mirrored control data) may not receive the control data (due, at least in part, by a lack of layer 2 connectivity between gateways). As data ports for mirrored data from switch 912z (and 912y) may be limited, recording difficulties may result.

Figure 13:
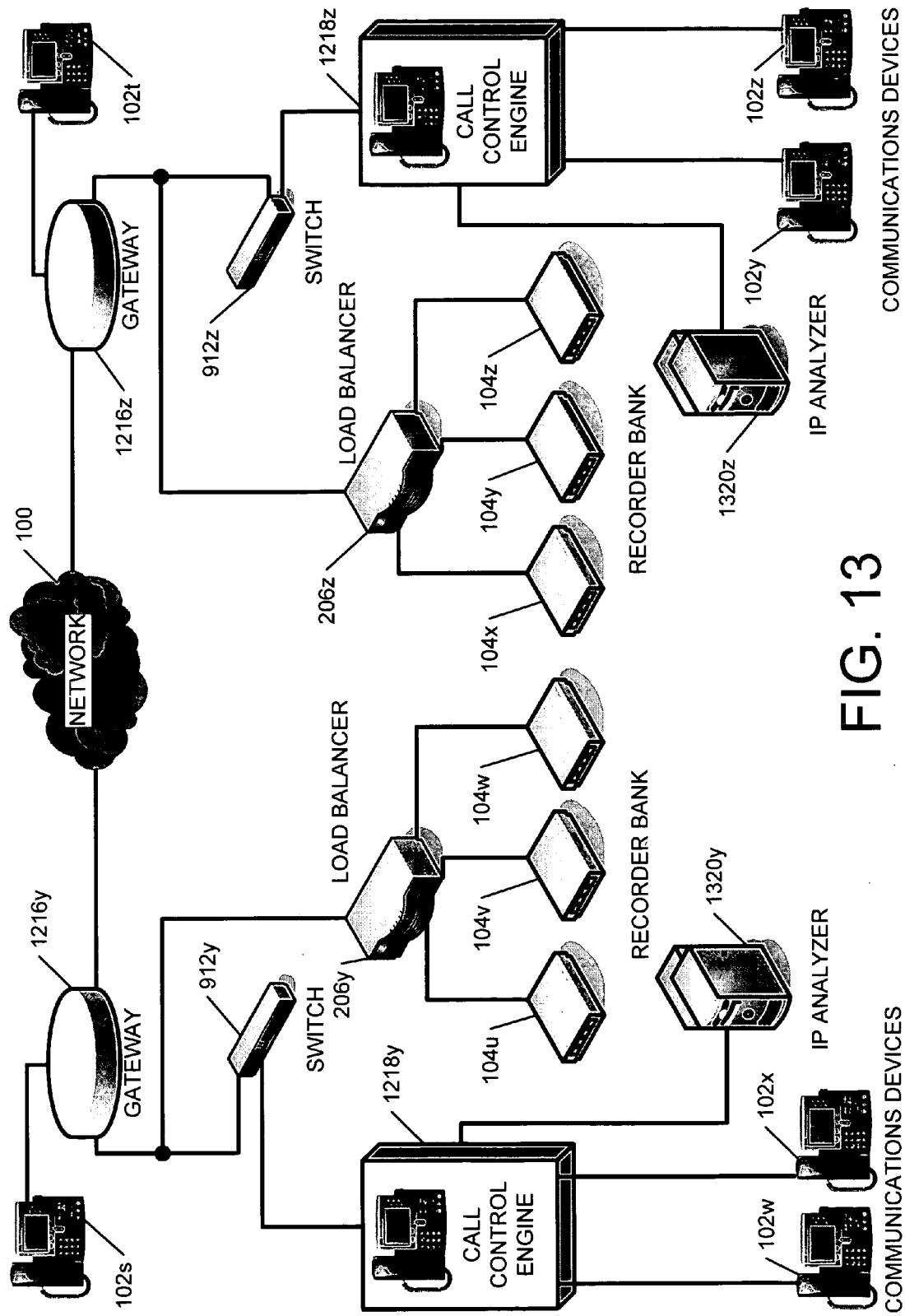
FIG. 13 is an exemplary network configuration illustrating use of an embodiment of an IP analyzer in a network configuration such as in FIG. 12.

FIG. 13 is an exemplary network configuration illustrating use of an IP analyzer in a network configuration such as in FIG. 12. As illustrated, the network of FIG. 12 is illustrated with the addition of IP analyzers 1218y and 1218z coupled to call control engines 1322y and 1322z, respectively. As illustrated, IP analyzer 1320 can include one or more components (e.g., software servers and hardware servers), depending on the particular configuration. Additionally, IP analyzers 1322y and 1322z can be configured as servers that include logic configured to facilitate recording across a plurality of gateways.

More specifically, in at least one nonlimiting example, if a user on communications device 102w desires to initiate a communication with a user on communications device 102t, control data associated with the communication can be sent to IP analyzer 1320y. The IP analyzer 1320y can be configured to send the received control data to load balancer 206z. Additionally, as discussed above, the mirrored communications data can be sent to load balancer 206z. With both the control data and the communication data, the load balancer can facilitate recording of the communication via one or more of the recorders 104x, 104y, and 104z.

One should note that depending on the particular embodiment, the IP analyzer 1320 can be configured for call control forwarding and/or intelligent call control distribution. More specifically, with respect to call control forwarding, the recorders 104x, 104y, and 104z are generally unable to receive mirrored data from call control engine 1218y due to the lack of layer 2 network connectivity between the two components. The IP analyzer 1320y can be configured to receive mirrored control data from call control engine 1218y. The IP analyzer 1320y can receive and forward control data to one or more of the recorders 104x, 104y, and 104z across a TCP/IP connection or other medium. Additionally, the IP analyzer 1320y can also be configured to send the control data to recorders 104u, 104v, and 104w with little or no concept of the geographic location of the recorders. During call control forwarding, the IP analyzer can be configured to forward all control data to all recorders communicatively coupled to the IP analyzer 1320y.

With respect to intelligent call control distribution, the IP analyzer 1320y can be configured to intelligently distribute control data to recorders based on a predetermined address for each recorder (or recorder bank). More specifically, if a communication commences between communications device 102w and 102s, load balancer 206z (and thus recorders 104x, 104y, and 104z) will generally not receive communication data related to this communication. As such, with intelligent call control distribution, IP analyzer 1320y can be configured to send control data only to the load balancer that facilitates recording of the call (in this nonlimiting example load balancer 206y), which has a known address (e.g., IP address and Media Access Control (MAC) address). Other load balancers (and thus recorders) that are not configured to receive communication data related to this particular communication will not receive control data related to the communication.

Additionally, while one IP analyzer 1320 can be utilized for predetermined network traffic, in at least one configuration, a plurality of IP analyzers can be utilized for fail-over protection. Additionally, depending on the particular configuration, one or more link protectors and/or load balancers may be coupled to the IP analyzer 1320.

Figure 14:
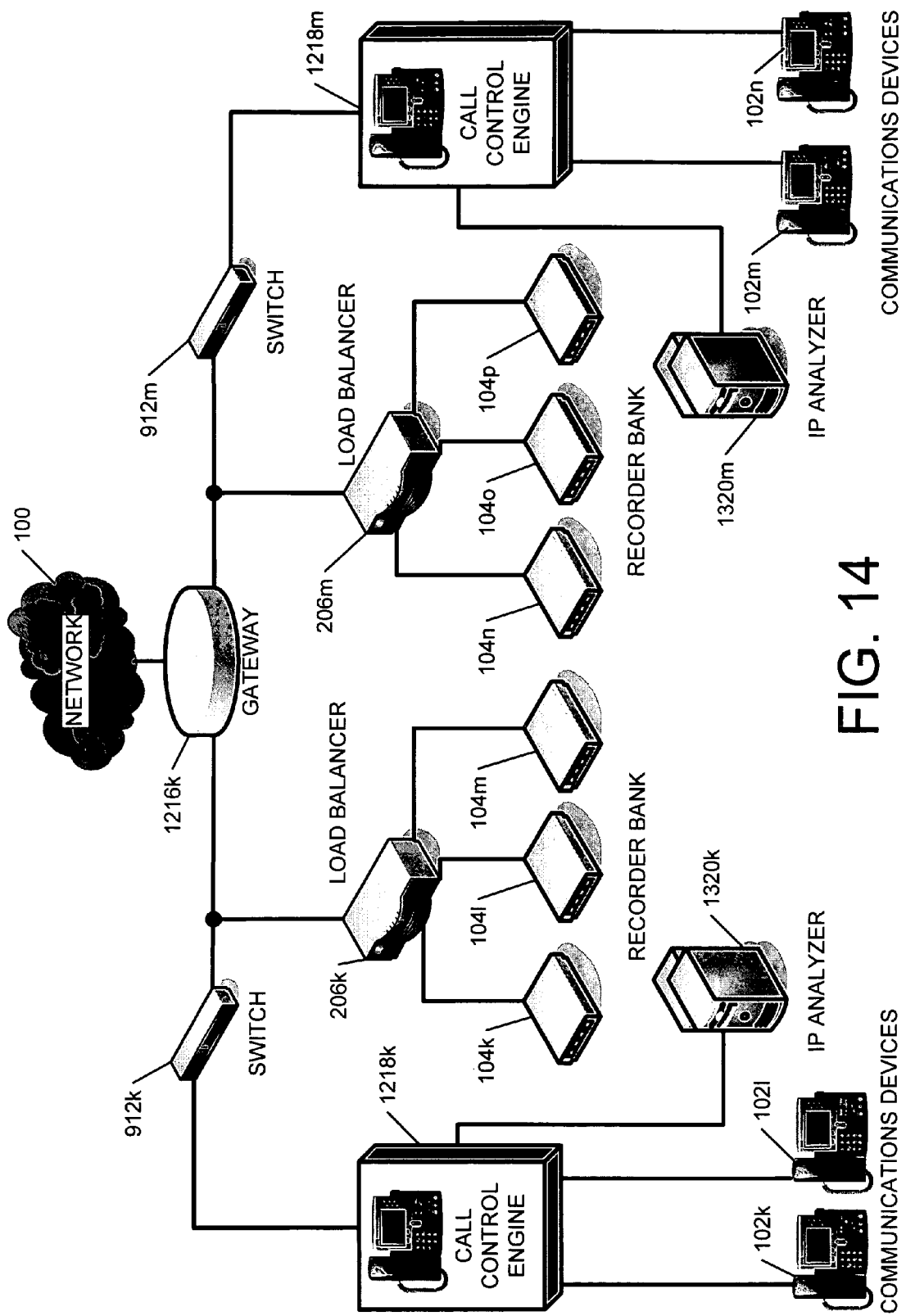
FIG. 14 is an exemplary network configuration illustrating use an embodiment of an IP analyzer in a network configuration with multiple switches.

FIG. 14 is an exemplary network configuration illustrating use an embodiment of an IP analyzer in a network configuration with multiple switches. As illustrated, the network 100 is coupled to a gateway 1216k, which is also coupled to switches 912k and 912m. Switch 912k is coupled to call control engine 1218k, which is coupled to communications devices 102k and 102l, as well as IP analyzer 1320k. Load balancer 206k is passively coupled between gateway 1216k and switch 912k. Load balancer 206k is also coupled to recorders 104k, 104l, and 104m.

Similarly, load balancer 206m is passively coupled between gateway 1216k and switch 912m. Load balancer is also coupled to recorders 104n, 104o, and 104p. Switch 912m is coupled to call control engine 1218m. Call control engine 1218m is coupled to communications devices 102m and 102n, as well as IP analyzer 1320m.

Figure 15:
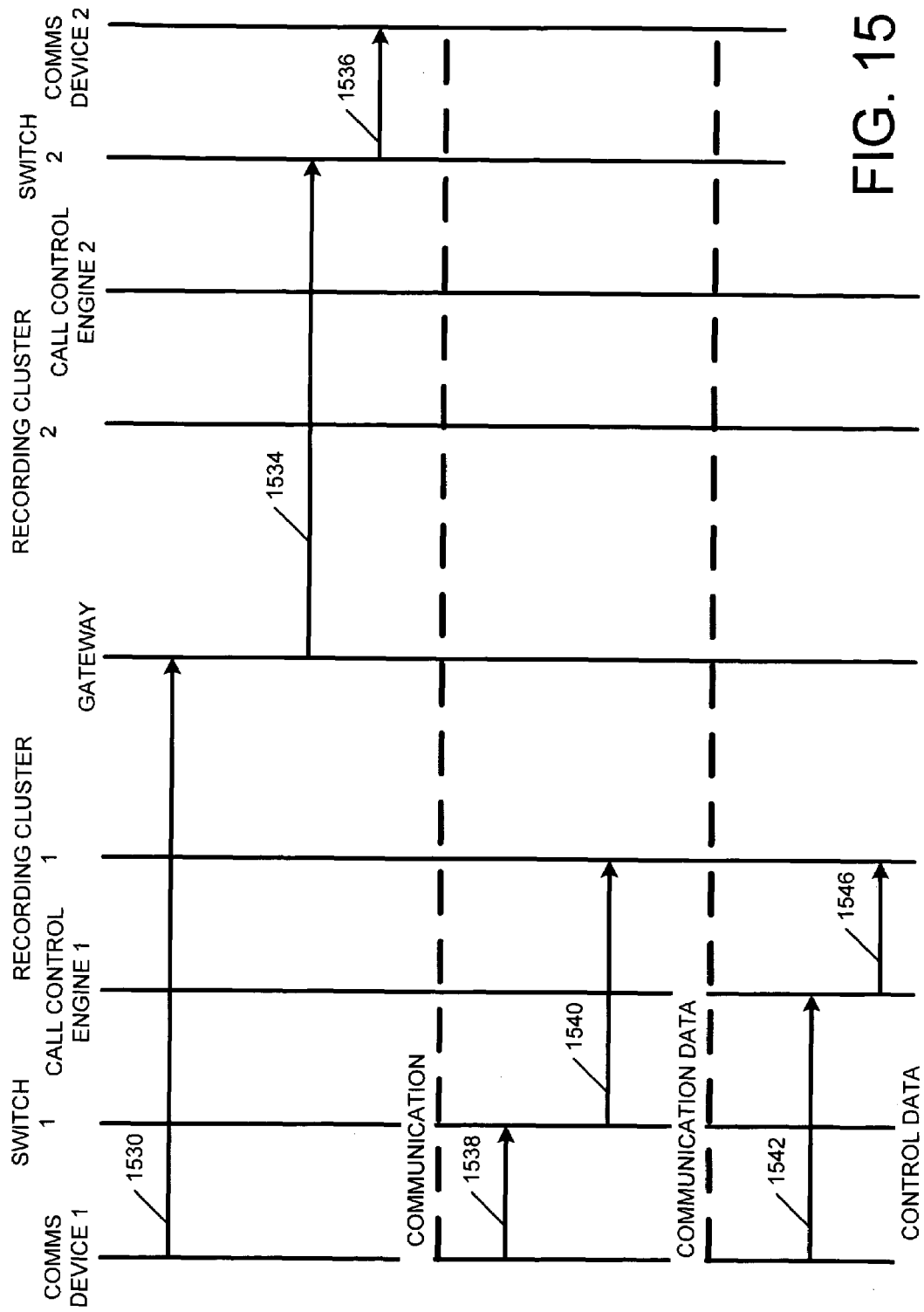
FIG. 15 is a sequence diagram illustrating exemplary steps that may be taken in recording a communication in the network configuration from FIG. 12.

FIG. 15 is a sequence diagram illustrating exemplary steps that may be taken in recording a communication in the network configuration from FIG. 12. More specifically, as discussed above, in attempting to record a communication across a single gateway without use of an IP analyzer 1322, the first step for facilitating the communication may include communications device 1 (component 102w) sending data to the gateway 1216 (step 1530). The gateway 1216y then sends at least a portion of the data to switch 2 (not shown), as illustrated in step 1534. Switch 2 (not shown) can then send at least a portion of the received data to communications device 2 (not shown), as illustrated in step 1536.

Additionally, in attempting to record the communication data related to the communication, the first step is for communications device 1 (component 102w) to send data to switch 1 (component 912y), as illustrated in step 1538. Switch 1 (component 912y) then sends the received communication data to recording cluster 1 (component 206y).

Similarly, in attempting to record control data in this nonlimiting example, communications device 1 (component 102w) sends control data to call control engine 1 (component 1218y), as illustrated in step 1542. Call control engine 1 (component 1218y) then sends at least a portion of the received control data to recording cluster 1 (component 206y), as illustrated in step 1546.

Figure 16:
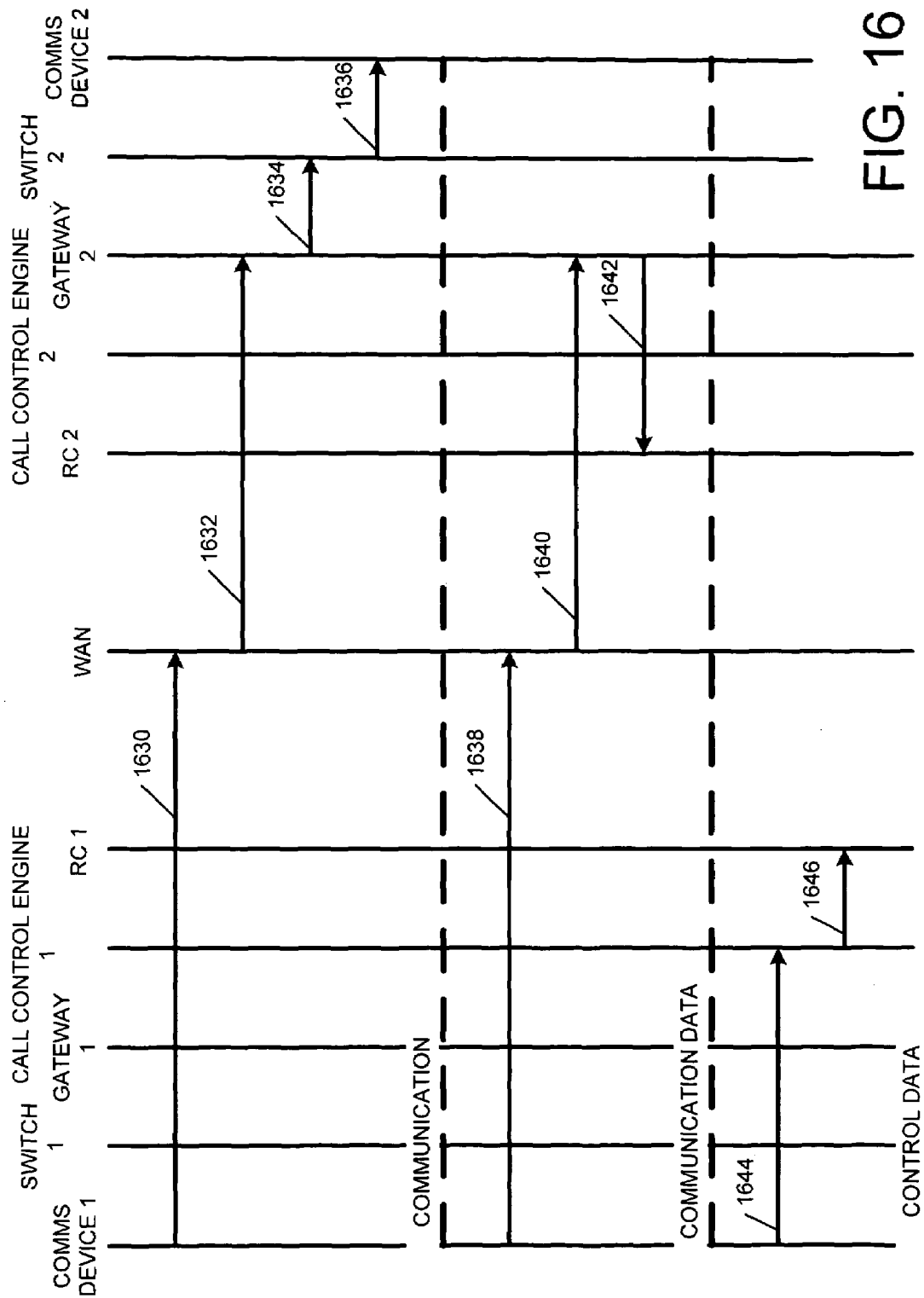
FIG. 16 is a sequence diagram illustrating various steps that may be taken in recording a communication across a wide area network, similar to sequence diagram from FIG. 15.

FIG. 16 is a sequence diagram illustrating various steps that may be taken in recording a communication across a wide area network, similar to sequence diagram from FIG. 15. As illustrated in this nonlimiting example, in facilitating the communication, communications device 1 (component 102w) sends data to WAN (component 100), as illustrated in step 1630. WAN (component 100) sends the received data to gateway 2 (component 1216z), as illustrated in step 1632. Gateway 2 (component 1216z) sends at least a portion of the data to switch 2 (component 912z), as illustrated in step 1634. Switch 2 (component 912z) sends at least a portion of the received data to communications device 2 (component 102z).

With respect to the communication data for recording, communications device 1 (component 102w) sends communications data to WAN (component 100), as illustrated in step 1638. WAN (component 100) sends at least a portion of the received data to gateway 2 (component 1218z), as illustrated in step 1640. Gateway 2 (component 1218z) sends at least a portion of that data to recording cluster 2 (component 206z), as illustrated in step 1642.

With respect to the control data for recording, communications device 1 (component 102w) sends the control data to call control engine 1 (component 1218y), as illustrated in step 1644. Call control engine sends at least a portion of the received control data to recording cluster 1 (component 206y), as illustrated in step 1646. As demonstrated in this nonlimiting example, the control data is received at recording cluster 1 (component 206y), while the communication data is received at recording cluster 2 (component 206z). For at least the reason, that in some configurations, layer 2 connectivity may not exist between gateways, recording of communications that traverse a plurality of gateways without an IP analyzer may be difficult.

Figure 17:
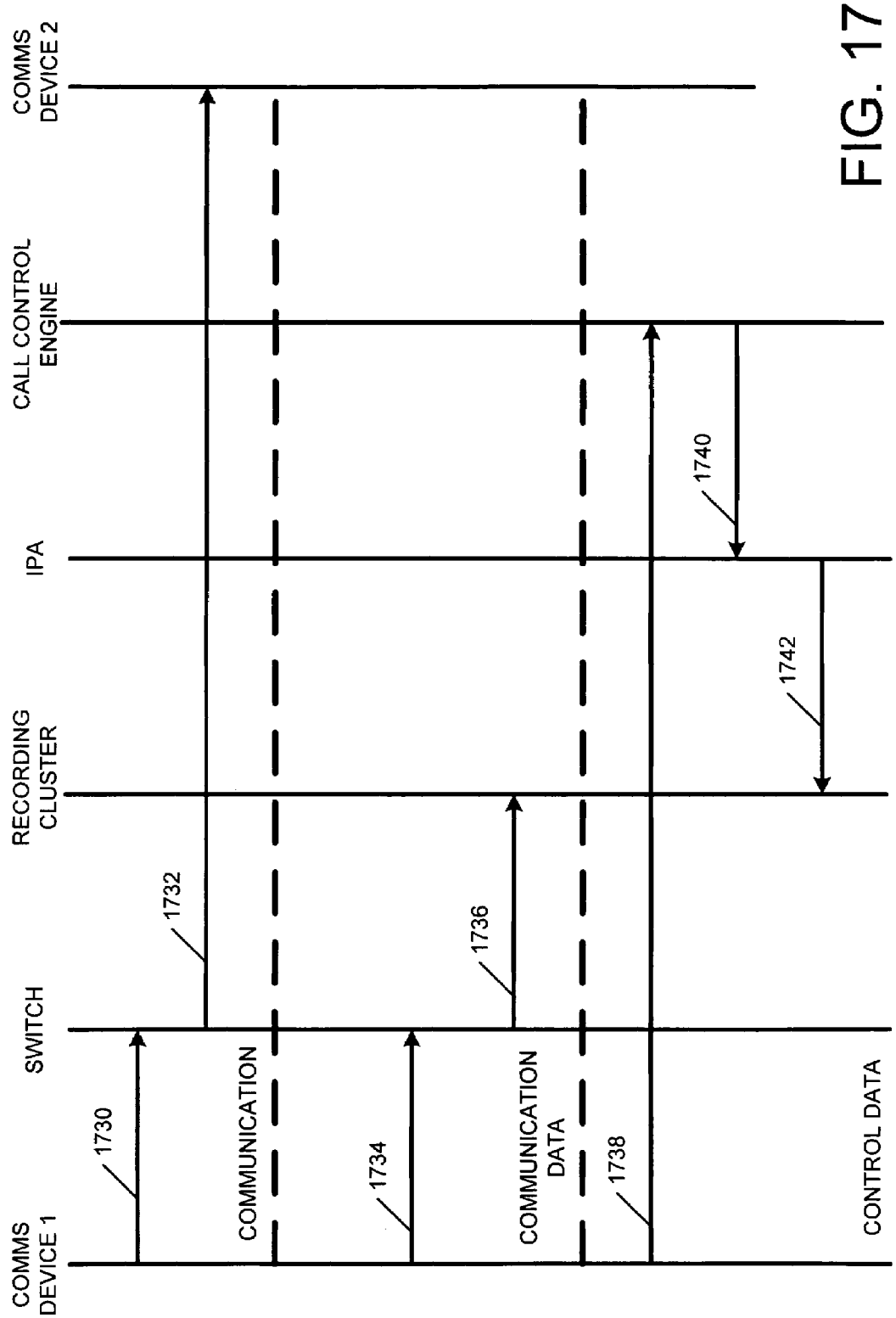
FIG. 17 is a sequence diagram illustrating exemplary steps that may be taken when utilizing an IP analyzer in recording a communication in a network, such as the network configuration from FIG. 13.

FIG. 17 is a sequence diagram illustrating exemplary steps that may be taken when utilizing an IP analyzer in recording a communication in a network, such as the network configuration from FIG. 13. In this nonlimiting example, in facilitating a communication between communications device 1 (component 102w) and communications device 2 (component 102x), communications device 1 (component 102w) sends data to switch (component 912y), as illustrated in step 1730. Switch (component 912y) sends at least a portion of the received data to communications device (component 102x), as illustrated in 1732.

To record communications data in this nonlimiting example, communications device 1 (component 102w) sends communications data to switch (component 912y), as illustrated in step 1734. Switch (component 912y) then sends at least a portion of the received data to recording cluster (component 206y), as illustrated in step 1736.

To record control data, communications device 1 (component 102w) sends at least a portion of the control data for the communication to call control engine (component 1218y), as illustrated in step 1738. Call control engine (component 1218y) sends at least a portion of the received data to IP analyzer (component 1320y), as illustrated in step 1740. IP analyzer (component 1320y) then sends at least a portion of the control data to the recording cluster (component 206y), as illustrated in step 1742. As discussed above, by utilizing an IP analyzer, both the control data and the communications data can be sent to the desired load balancer for recording.

Figure 18:
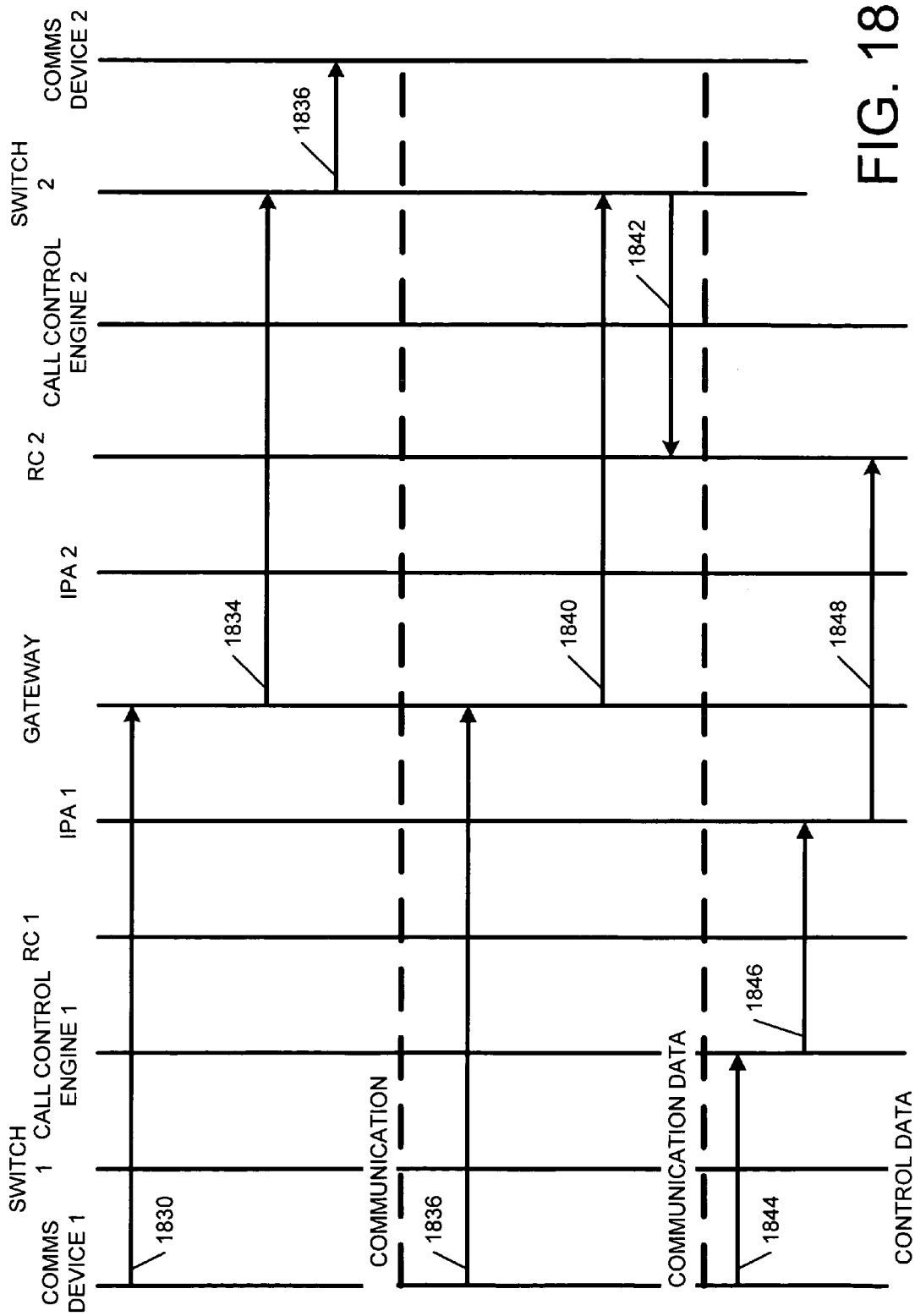
FIG. 18 is a sequence diagram illustrating exemplary steps that can be taken in utilizing an embodiment of an IP analyzer when recording a communication across a gateway.

FIG. 18 is a sequence diagram illustrating exemplary steps that can be taken in utilizing an embodiment of an IP analyzer when recording a communication across a gateway. The first step for facilitating a communication between communications device 1 (component 102k) and communications device 2 (102n) is for communications device 1 (component 102k) to send data to gateway (component 1216k), as illustrated in step 1830. Gateway (component 1216k) then sends the received data to switch 2 (component 912m), as illustrated in step 1834. Switch 2 (912m) then sends the received data to communications device 2 (102n), as illustrated in step 1836.

In sending communications data for recording, communications device 1 (component 102k) sends data to gateway (component 1216k), as illustrated in step 1836. Gateway (component 1216k) then sends the received data to switch 912m), as illustrated in step 1840. Recording cluster 2 (206m) then receives mirrored data from switch 2 (912m), as illustrated in step 1842.

In communicating control data for recording, communications device 1 (component 102k) sends control data to call control engine 1 (component 1218k), as illustrated in step 1844. Call control engine 1 (component 1218k) then sends data to IP analyzer 1 (component 1320k), as illustrated in step 1846. IP analyzer (component 1320k) then sends at least a portion of the received control data to load balancer 206m), as illustrated in step 1848.

Similar to the discussion above, the IP analyzer in this nonlimiting example enables a desired load balancer 206m to receive both control data and communications data related to the call. The load balancer 206m can be configured to then send the received data to one or more of the recorders 104n, 104o, and/or 104p coupled to the load balancer 206m.

Figure 19:
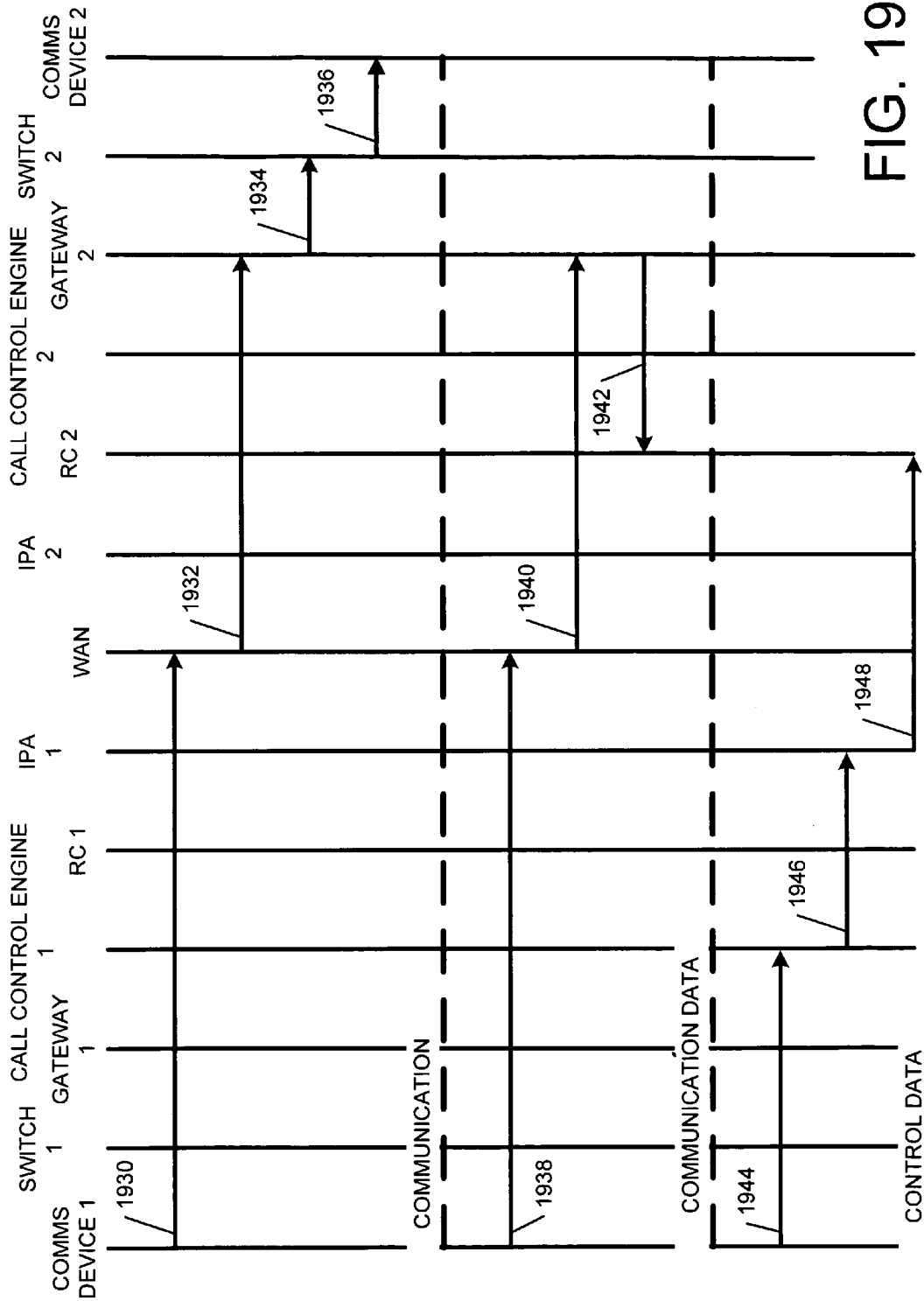
FIG. 19 is a sequence diagram illustrating exemplary steps that may be taken in utilizing an IP analyzer when recording a communication across a wide area network.

FIG. 19 is a sequence diagram illustrating exemplary steps that may be taken in utilizing an IP analyzer when recording a communication across a wide area network. The first step in facilitating a communication between communications device 1 (component 102w) and communications device 2 (component 102y) is for communications device 1 (component 102w) to send data to WAN (component 100), as illustrated in block 1930.

In sending communication data for recording communications device 1 (component 102w) sends communication data to WAN (component 100), as illustrated in step 1938. WAN (component 100), then sends the received data to gateway 2 (component 1216z), as illustrated in step 1940. Recording cluster 2 (component 206z) then receives mirrored data from gateway 2 (component 1216z), as illustrated in step 1942.

In sending control data for recording, communications device 1 (component 102w) sends control data to call control engine 1 (component 1218y), as illustrated in step 1944. Call control engine 1 (component 1218y) then sends the received data to IP analyzer 1 (component 1320y), as illustrated in step 1946. IP analyzer 1 (component 1320y) then sends at least a portion of the received data to recording cluster 2 (component 206z) for recording, as illustrated in 1948. As discussed above, the nonlimiting example of FIG. 19 illustrates that in utilizing an IP analyzer for recording across a network, such as a WAN, ATM, the Internet, etc., both the communication data and the control data can be sent to a desired load balancer and/or recorder.

One should also note that depending on the particular configuration the IP analyzer can be configured to receive control data interpret the received control data. Additionally, depending on the particular embodiment, the IP analyzer can issue a start record command, a stop record command, and/or other commands one or more recorders.

As one of ordinary skill in the art will understand, while the flowcharts and sequence diagrams discussed in this disclosure are illustrated as occurring in a particular order, this is a nonlimiting example. The steps in this disclosure can occur in any of a plurality of different orders, and may include more or fewer steps than illustrated herein. Additionally, while the steps in FIGS. 4 and 5 relate to steps that are performed by load balancer 206 and the steps in FIGS. 10 and 11 are performed by a link protector, these are also a nonlimiting examples. As one of ordinary skill in the art will understand, depending on the particular configuration, one or more of the steps can be performed by a different component than described in those examples.

One should note that the flowcharts and sequence diagrams included herein show the architecture, functionality, and/or operation of a possible implementation of logic. In this regard, each block can be interpreted to represent a hardware component, a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should also note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

Therefore, at least the following is claimed:

1. An Internet protocol (IP) analyzer configured to facilitate recording of at least one communication, the IP analyzer comprising:
   a processor; and
   a volatile and nonvolatile memory, in which the processor executes:
      logic configured to receive control data related to a communication;
      logic configured to select at least one recorder that is configured to receive communication data related to the communication, wherein communication data related to the communication is sent to the selected at least one recorder via a layer 2 protocol; and
      logic configured to route, via a layer 3 protocol, the received control data to the selected at least one recorder.

2. The IP analyzer of claim 1, wherein the communication traverses at least one of the following: a wide area network (WAN) and an Asynchronous Transfer Mode (ATM) network.

3. The IP analyzer of claim 1, wherein the logic configured to receive the control data is further configured to passively receive mirrored control data.

4. The IP analyzer of claim 3, further comprising logic configured to passively receive the mirrored control data from the call control engine.

5. The IP analyzer of claim 1, further comprising logic configured to send control data to all recorders communicatively coupled to the IP analyzer.

6. The IP analyzer of claim 1, further comprising logic configured to determine an address associated with the at least one recorder that is configured to receive the communication data.

7. The IP analyzer of claim 1, further comprising logic configured to send data to a load balancer via a TCP/IP connection.

8. A method for facilitating routing of control data associated with a communication to a plurality of recorders, the method comprising:
   receiving control data related to a communication at an Internet Protocol (IP) analyzer, wherein the communication is configured for transmission across a Wide Area Network (WAN) via a layer 3 protocol; and
   routing the received control data by the IP analyzer to at least one recorder via a layer 2 protocol.

9. The method of claim 8, wherein routing the received control data to at least one recorder includes routing the received control data to at least one load balancer, the at least one load balancer being configured to distribute received data among a plurality of recorders.

10. The method of claim 8, further comprising selecting at least one load balancer for receiving communication data related to the communication.

11. The method of claim 8, further comprising routing the received control data to all recorders that are communicatively coupled to the WAN.

12. The method of claim 8, wherein sending control data to at least one recorder includes sending control data across a TCP/IP connection.

13. The method of claim 12, wherein the received control data includes passively received mirrored data.

14. The method of claim 8, wherein the received control data is received from a call control engine.

15. A system for routing communication data to a plurality of recorders, comprising:
   at least one recorder configured to receive communications data via a layer 2 protocol and interpret at least a portion of the data received via the layer 2 protocol; and
   an Internet Protocol (IP) analyzer coupled to the at least one recorder, the IP analyzer configured to:
      receive control data related to the communication via the layer 2 protocol;
      select at least one recorder that is configured to receive communication data related to the communication; and
      route control data to the selected at least one recorder via a layer 2 protocol.

16. The system of claim 15, wherein the communication traverses at least one of the following: a wide area network (WAN) and an Asynchronous Transfer Mode (ATM) network.

17. The system of claim 15, wherein the IP analyzer is further configured to passively receive mirrored control data.

18. The system of claim 17, wherein the IP analyzer is configured to passively receive the mirrored control data from the call control engine.

19. The system of claim 15, further comprising a plurality of recorders, at least one of the plurality of recorders being configured to receive data related to the communication.

20. The system of claim 15, wherein the IP analyzer is further configured to interpret the received data and issue at least one record command to at least one recorder.

* * * * *